United States Patent
Harrower et al.

(10) Patent No.: US 10,431,122 B2
(45) Date of Patent: Oct. 1, 2019

(54) SYSTEMS AND METHODS FOR SMART CARTOGRAPHY

(71) Applicant: Environmental Systems Research Institute (ESRI), Redlands, CA (US)

(72) Inventors: Mark Harrower, Las Vegas, NV (US); Jeremy Bartley, Redlands, CA (US); Michael Minami, Redlands, CA (US); Praveenkumar Ponnusamy, Redlands, CA (US); Jerome Chia-rung Yang, Boston, MA (US)

(73) Assignee: Environmental Systems Research Institute (ESRI), Redlands, CA (US)

(*) Notice: Subject to any disclaimer, the term of this patent is extended or adjusted under 35 U.S.C. 154(b) by 472 days.

(21) Appl. No.: 15/052,799

(22) Filed: Feb. 24, 2016

(65) Prior Publication Data

US 2016/0246468 A1    Aug. 25, 2016

Related U.S. Application Data

(60) Provisional application No. 62/193,718, filed on Jul. 17, 2015, provisional application No. 62/120,837, filed on Feb. 25, 2015.

(51) Int. Cl.
*G09B 29/10* (2006.01)
*G09B 29/00* (2006.01)
(Continued)

(52) U.S. Cl.
CPC .......... *G09B 29/106* (2013.01); *G01C 21/32* (2013.01); *G06T 11/00* (2013.01); *G09B 29/004* (2013.01);
(Continued)

(58) Field of Classification Search
CPC combination set(s) only.
See application file for complete search history.

(56) References Cited

U.S. PATENT DOCUMENTS

| 2,503,126 A * | 4/1950 | Muldrow | ............. G09B 29/004 156/249 |
| 6,587,787 B1 | 7/2003 | Yokota | |

(Continued)

FOREIGN PATENT DOCUMENTS

| EP | 3262604 A1 | 1/2018 |
| WO | 2016138259 A1 | 9/2016 |

OTHER PUBLICATIONS

Univ. of Wisc., Concepts and Methods for Rule-Based Web Cartography, 2011, accessible at <URL=https://www.sco.wisc.edu/wp-content/uploads/2017/07/SCO_web_map_concepts_v1.0.pdf> (Year: 2011).*

(Continued)

*Primary Examiner* — Doon Y Chow
*Assistant Examiner* — James T Tsai
(74) *Attorney, Agent, or Firm* — Kilpatrick Townsend & Stockton LLP

(57) ABSTRACT

A method is provided for setting, by a processor, a minimum and maximum symbol size for rendering at different zoom levels on a digital map. In another embodiment of the invention, the size of overlay features, such as line widths, received by a processor is automatically adjusted for different zoom levels depending on the average size of map features, such as polygons. In one example, line widths are decreased, and/or made partially transparent, as the map views are zoomed out, finally being altogether eliminated. In one embodiment, the system automatically analyzes received data to determine an appropriate way to map the data.

9 Claims, 20 Drawing Sheets

(51) Int. Cl.
*G01C 21/32* (2006.01)
*G06T 11/00* (2006.01)
(52) U.S. Cl.
CPC .............. *G06F 2203/04806* (2013.01); *G06T 2210/36* (2013.01)

(56) References Cited

U.S. PATENT DOCUMENTS

| | | | | |
|---|---|---|---|---|
| 7,868,785 | B1* | 1/2011 | Wang | G08G 5/0021 340/972 |
| 8,937,627 | B1* | 1/2015 | Otero | G06F 3/1423 345/619 |
| 2004/0201836 | A1 | 10/2004 | Chang et al. | |
| 2005/0229110 | A1* | 10/2005 | Gegner | G06F 3/0481 715/800 |
| 2005/0261826 | A1* | 11/2005 | Kurosawa | G01C 21/32 701/429 |
| 2007/0219938 | A1* | 9/2007 | Boersma | G06F 17/30241 |
| 2008/0013792 | A1* | 1/2008 | Houllier | G06F 3/0481 382/113 |
| 2009/0263026 | A1* | 10/2009 | Verne | G06Q 30/0241 382/209 |
| 2012/0194558 | A1* | 8/2012 | Dykes | G06T 11/206 345/660 |
| 2013/0113819 | A1* | 5/2013 | Gurusamy | G08G 5/0021 345/592 |
| 2013/0120460 | A1* | 5/2013 | Adams | G06T 13/80 345/660 |
| 2013/0152001 | A1* | 6/2013 | Lovitt | G06F 3/0482 715/765 |
| 2014/0347383 | A1 | 11/2014 | Maurer et al. | |
| 2015/0332481 | A1* | 11/2015 | Rosasco | G06T 11/001 345/660 |
| 2017/0211941 | A1* | 7/2017 | Thom | G01C 21/32 |

OTHER PUBLICATIONS

Susumu Tanimura, Chusi Kuroiwa, Tsutomu Mizota, Proportional Symbol Mapping in R, J. of Statistical Software, vol. 15, issue 5 ( 2006). (Year: 2006).*
PCT/US2016/019558, "International Preliminary Report on Patentability", dated Sep. 8, 2017, 9 pages.
PCT/US2016/019558, "International Search Report and Written Opinion", dated Jul. 18, 2016, 14 pages.
PCT/US2016/019558, "Invitation to Pay Additional Fees and Partial Search Report", dated May 6, 2016, 3 pages.
European Patent Application No. 16756355.0, Partial Supplementary European Search Report, dated Oct. 26, 2018, 14 pages.
Iosifescu-Enescu et al., "Web Cartography with Open Standards—A Solution to Cartographic Challenges of Environmental Management", Environmental Modelling & Software, vol. 25, Issue 9, Sep. 2010, pp. 988-999.
Kunigami et al., "Optimizing the Layout of Proportional Symbol Maps: Polyhedra and Computation", Informs Journal on Computing, vol. No. 26, Issue No. 2, May 2014, pp. 199-207.
Sandvik , "Using KML for Thematic Mapping. Part 2 Supporting Document: Thematic Mapping Engine", Institute of Geography School of GeoSciences University of Edinburgh, Dec. 2008, pp. 1-54.

* cited by examiner

300 ⬎

| Zoom | Value | Size |
|------|-------|------|
| 7    | 1,000 | 1px  |
| 8    | 1,000 | 2px  |
| 9    | 1,000 | 3px  |
| 10   | 1,000 | 4px  |

| Zoom | Value | Size |
|------|-------|------|
| 5    | 1,000 | 1px  |
| 6    | 1,000 | 1px  |
| 7    | 1,000 | 1px  |
| 8    | 1,000 | 2px  |
| 9    | 1,000 | 3px  |
| 10   | 1,000 | 4px  |
| 11   | 1,000 | 4px  |
| 12   | 1,000 | 4px  |

FIG. 3B

|  | Points | Lines | Areas |
|---|---|---|---|
| Just 402 Locations | a. Pushpins. Very dense points can be generalized into circles. | b. Lines. | c. Polygons. |
| Bin Locations 404 | d. Bin to known geography (counts per enumeration unit, e.g., countries), unclassed color ramp is used to denote counts<br><br>e. Hexbin (counts per hexagon)<br><br>f. Heat Map (kernel density function, beyond simple binning). | | |
| Nominal Data 406 | g. Colored Pushpins - max 10 unique hues (up to 10 unique cats). User can group many unique values into 10< categories | h. Colored Lines - same thickness and line style, max 10 unique hues (for up to 10 unique categories). | i. Colored Polygons - up to 10 unique hues (for poly fill). |
| Ordinal Data 408 | j. Colored Pt Symbol - rather than use hue, use n-class color sequential ramp (5 categories = 5 orderable colors, suggest max 10)<br><br>k. Graduated Pt Symbols - keep color same, use graduated sizes (5 classes = 5 sizes) | l. Colored Lines - (sequential color ramp)<br><br>m. Graduated Lines (as many line thicknesses as there are categories) | n. Colored Poly Fills - (sequential, typically not diverging color ramp)<br><br>o. Graduated Circles |
| Numerical 410 | One-to-One Mapping:<br>p. Proportional Symbol (circles)<br><br>q. Colored Symbol (apply continuous color ramp to pts, diverging or sequential colors),<br>r. Rotated Symbol (rotation angle of symbol),<br>s. Proportional Transparency<br>Create Surface:<br>T1. Isoline/Contours to show statistical surface<br>T2. Weighted Heat Map to show interpolated values / intensities.<br>Aggregate to Polygons:<br>Offer user known geographies, swap in appropriate areal choices after aggregating. | Flowlines: Three kinds:<br><br>u. Continuous Color Ramp (apply color ramp to lines, keep thickness constant).<br>v. Proportional Line Thickness (proportional to the data, same line color).<br>w. Proportional Transparency | x. Dot Density<br><br>y. Proportional Symbol<br><br>z. Choropleth - |

FIG. 4

| Type | Figure |
|---|---|
| Sequential - Linear (Simple High to Low)<br>• Sample<br>• Chunk data to use the ramp only within one or two standard deviations.<br>• Map value to color linearly within the range. | 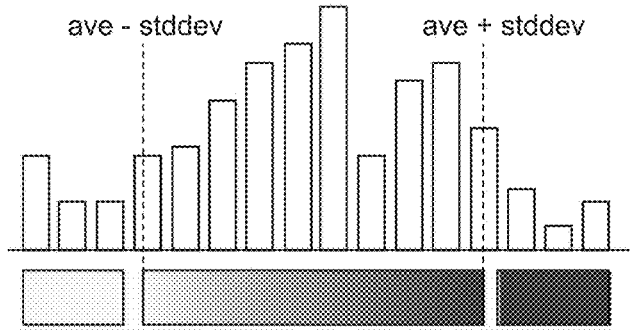 |
| Diverging (Above and Below)<br>Sample | 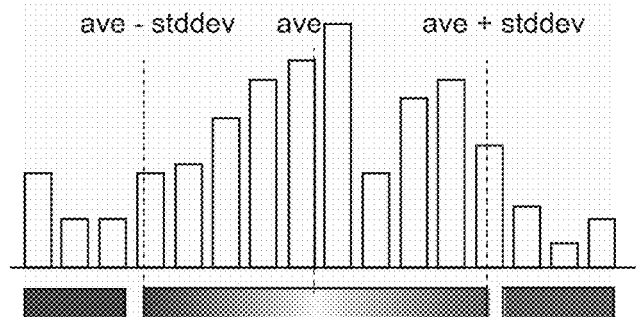 |
| Highlight (Centered on)<br>Sample | 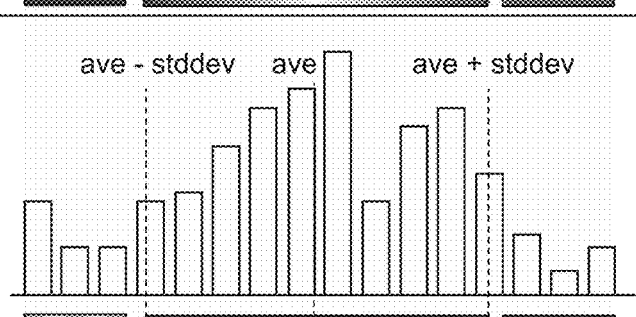 |
FIG. 5

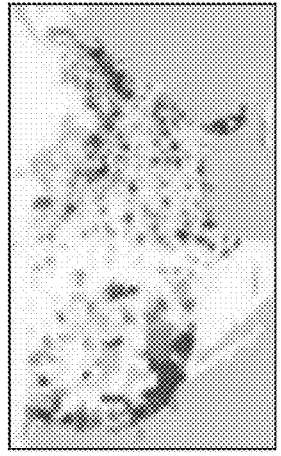
FIG. 16A
No stroke
Drop the stroke automatically when the avg poly size is 5x5 pixels (or smaller)
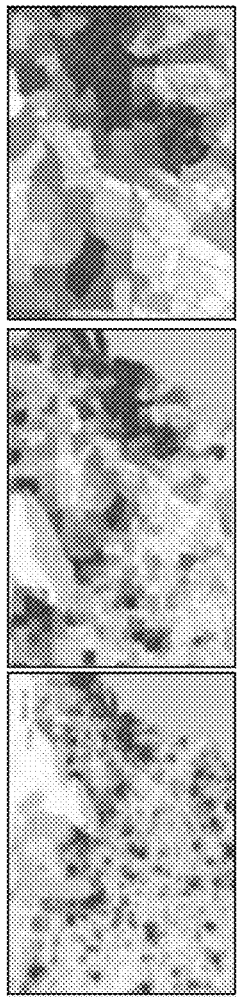
FIG. 16B
10x10 pixels
FIG. 16C
FIG. 16D
40x40 pixels average
1 pt, 50% transparency
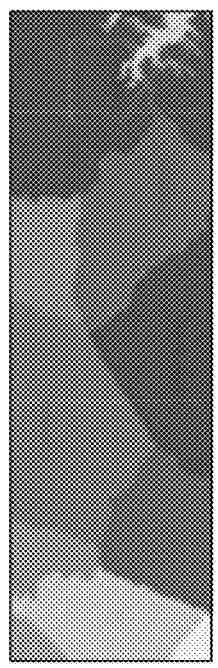
FIG. 16E
2 pt, 50% transparency
Switch to 2 pixel stroke when the average polygon size greater than ~ 250x250 pixels

SYSTEMS AND METHODS FOR SMART CARTOGRAPHY

CROSS-REFERENCES TO RELATED APPLICATIONS

This application claims priority to provisional application Ser. No. 62/193,718, filed Jul. 17, 2015, entitled "Smart Mapping Autozoom" and provisional application Ser. No. 62/120,837 filed Feb. 25, 2015, entitled "Systems and Methods for Smart Cartography."

BACKGROUND OF THE INVENTION

The present invention relates to the rendering of overlays on maps, and in particular rendering overlays at different zoom levels.

A problem with zooming on digital maps is that features, such as text labels, icons, boundary lines, etc. overwhelm the map if they stay the same size as a user zooms in, and become less cosmetically pleasing as a user zooms out. One solution is to manually set different sizes for different zoom levels, or require the user to make an adjustment. Another solution is to change the size proportionately.

There are many examples of solutions in the prior art. Publ. 20080013792 describes a proportional variation in symbol size with zoom. RIM Pub. 20150009234 describes reducing the amount of map data transmitted to a mobile device depending on the zoom level. Polygon features that become smaller than a threshold are discarded at a certain zoom level. Polygon lines are suppressed where they overlap with or are too close to another, higher priority polyline feature. Google Pub. 20150187337 describes removing colliding labels as a map is zoomed out.

ArcGIS by ESRI includes a capability to change feature size, such as a label, so that it fits within a polygon on the map (e.g., state, county boundary) as the map is zoomed out.

BRIEF SUMMARY

Smart Default Size Ranges for Proportional Symbol Maps

In certain embodiments of the invention, a method for proportionally sizing symbols on a map includes receiving, by a processor, geographic-based data having one or more polygonal features, and calculating an average polygonal feature size for at least a subset of the one or more polygonal features. The method can further include setting a minimum symbol size to a first predetermined percentage of the average feature size, and setting a maximum symbol size to a second predetermined percentage of the average feature size.

In exemplary embodiments, the minimum symbol size can be less than 100% of the average feature size and may range from 4 to 16 pixels, however other tolerances may be used. The maximum symbol size can greater than 100% of the average feature size and may range from 50-80 pixels, however other tolerances may be used. In some cases, the average feature size can be calculated using features associated with the geographic-based data including features outside of a current map extent.

In another embodiment of the invention, the size of overlay features received by a processor is automatically adjusted for different zoom levels depending on the average size of map features, such as polygons. In one example, line widths are decreased, and/or made partially transparent, as the map views are zoomed out, finally being altogether eliminated. In one example, the area taken up by a borderline is made proportional to the average area of the polygons. For example, there may be a maximum of 1 pixel of line for each 25 pixels of area inside a polygon. As the polygons get smaller, the line width narrows and/or becomes transparent, so they don't obscure the polygon area itself. As the polygons get bigger, the lines can become thicker.

Data-Driven Workflow for Picking an Appropriate Thematic Map

In certain implementations of the invention, a method of simplifying a map generation process includes receiving, by a processor, a dataset including a plurality of data values associated with a geographic map. The method further includes requesting a first user input indicating whether the data values correspond to a point, line, or area, and receiving a first user input response. The method can further include requesting a second user input indicating whether the data values correspond to a location, nominal data, ordinal data, or numerical data, receiving the second user input response, and displaying one or more optional map presentations of the dataset based on the first and second user input responses.

In one embodiment, a processor receives a dataset including a plurality of data values associated with a geographic map. The user, upon uploading the dataset with a front-end process, is prompted to tag the thematic and geo data. The processor retrieves a thematic user tag indicating whether a set of geo-tagged data in the dataset is category data or numerical data. If the thematic user tag indicates category data, a first subset of available display options is selected that is most appropriate for category data. If the thematic user tag indicates numerical data, a second subset of available display options is selected that is most appropriate for numeric data. The processor also retrieves a geometric user tag indicating whether a set of geo data in the dataset is points, lines or areas. If the geometric user tag indicates points, a first subset of available point display options is selected (e.g., pins). If the geometric user tag indicates lines, a line display option is selected. If the geometric user tag indicates areas, a polygon display option. Thus, the user experience is simplified and less confusing. For example, the user does not have to sift through options for lines and polygons when the data is points.

Other Embodiments

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

According to certain embodiments, a method of determining an optimal scale in a digital cartographical map includes receiving, by a processor, geographic-based data having one or more geographic properties and determining whether the geographic properties correspond a plurality of point features. If the geographic properties correspond to a plurality of point features, the method includes calculating, by the processor, a minimum distance between each point feature and its closest neighboring point feature, calculating an average minimum distance of at least a subset of the minimum distance calculations, and determining a scale to display the geographic-based data based on a tiling scheme that requires at least a first predetermined number of pixels to display the average minimum distance. The distance can be measured in map units. In some embodiments, the first predetermined number of pixels is 12 pixels. Other pixel values can be used, as would be appreciated by one of ordinary skill in the art.

Certain embodiments may further include determining an average of x-axis and y-axis coordinates for the point features in the geographic-based data and determining a map center based on the average of the x-axis and y-axis coordinates.

In further embodiments, the method includes determining, by the processor, whether the geographic properties correspond to a plurality of line features and, if the geographic properties correspond to a plurality of line features, calculating a length for at least a subset of the plurality of line features, e.g., in map units, calculating an average length based on the calculated lengths of the plurality of line features, and determining a scale that would need at least a second predetermined number of pixels to display the average length. In some embodiments, the second predetermined number of pixels is 30 pixels. Other pixel values can be used, as would be appreciated by one of ordinary skill in the art.

In some implementations, the method includes determining, by the processor, whether the geographic properties correspond to a plurality of polygonal features and, if the geographic properties correspond to a plurality of polygonal feature, calculating a size for at least a subset of the plurality of polygonal features, e.g., in map units, calculating an average size of the polygonal features based on the calculated sizes of the plurality of polygonal features, and determining a scale that would need at least a third predetermined number of pixels to display the average size. In some cases, the third predetermined number of pixels is 15 pixels by 15 pixels. Other pixel values, ranges, and tolerances can be used, as would be appreciated by one of ordinary skill in the art.

In some embodiments, a method for creating a dot map includes receiving, by a processor, a dataset including a plurality of data values, each data value corresponding to a certain location on a geographic map. The method further includes determining a location on the geographic map having a densest distribution of data values within the location's boundaries, determining a number of dots needed to substantially fill the location without overlapping dots, and calculating a number of data values per dot based on a total number of data values and the number of dots at the location. In exemplary embodiments, the dot sizes range from 1 pixel to 4 pixels in size and the dot map is scalable up to six zoom levels, where the number of data values per dot does not change as the dot map is scaled between zoom levels.

In some embodiments, a method of determining a bounded continuous color ramp for geographic data includes receiving a feature layer having a range of data values, determining minimum data value in the feature layer, determining a maximum data value in the feature layer, determining an average data value in the feature layer, determining a standard deviation of the data values in the feature layer, setting an upper bound that corresponds to a standard deviation above the average data value, setting a lower bound that corresponds to a standard deviation below the average data value, and displaying a linear color scale for data values in the feature layer that are within the standard deviation. Data values at or above the upper bound may be set to a first same color, and data values at or below the lower bound may be set to a second same color. The method can further include displaying user adjustable controls on a user interface, the controls operable to adjust the lower and upper bounds.

Certain embodiments of the invention relate to method of harmonizing thematic data for multiple layers in a geographically-based map. The method includes receiving base map data, the base map data being a first layer and including thematic data, receiving data for one or more additional layers, each additional layer including thematic data, changing the thematic data for the one or more additional layers to match the thematic data of the base map, and superimposing the base map and the one or more additional layers. In some cases, the thematic data includes one or more of a color scheme, line weights, opacity, text font(s), and text size(s). Thematic data associated with the one or more additional layers that is not found in the base map is not changed.

BRIEF DESCRIPTION OF THE DRAWINGS

The detailed description is set forth with reference to the accompanying figures. In the figures, the left-most digit(s) of a reference number identifies the figure (FIG.) in which the reference number first appears.

FIGS. 3A and 3B depict a table showing dot values across different ranges, according to certain embodiments of the invention.

FIG. 4 depicts a workflow to quickly and automatically analyze and match received data to determine an appropriate way to map the data, according to certain embodiments of the invention.

FIG. 5 illustrates several different representations of color maps including sequential linear, diverging, and highlighting, according to certain embodiments of the invention.

FIGS. 16A-16E are diagrams illustrating map view at different zoom levels using the method of FIG. 15, according to certain embodiments of the invention.

DETAILED DESCRIPTION

Figure 1A:
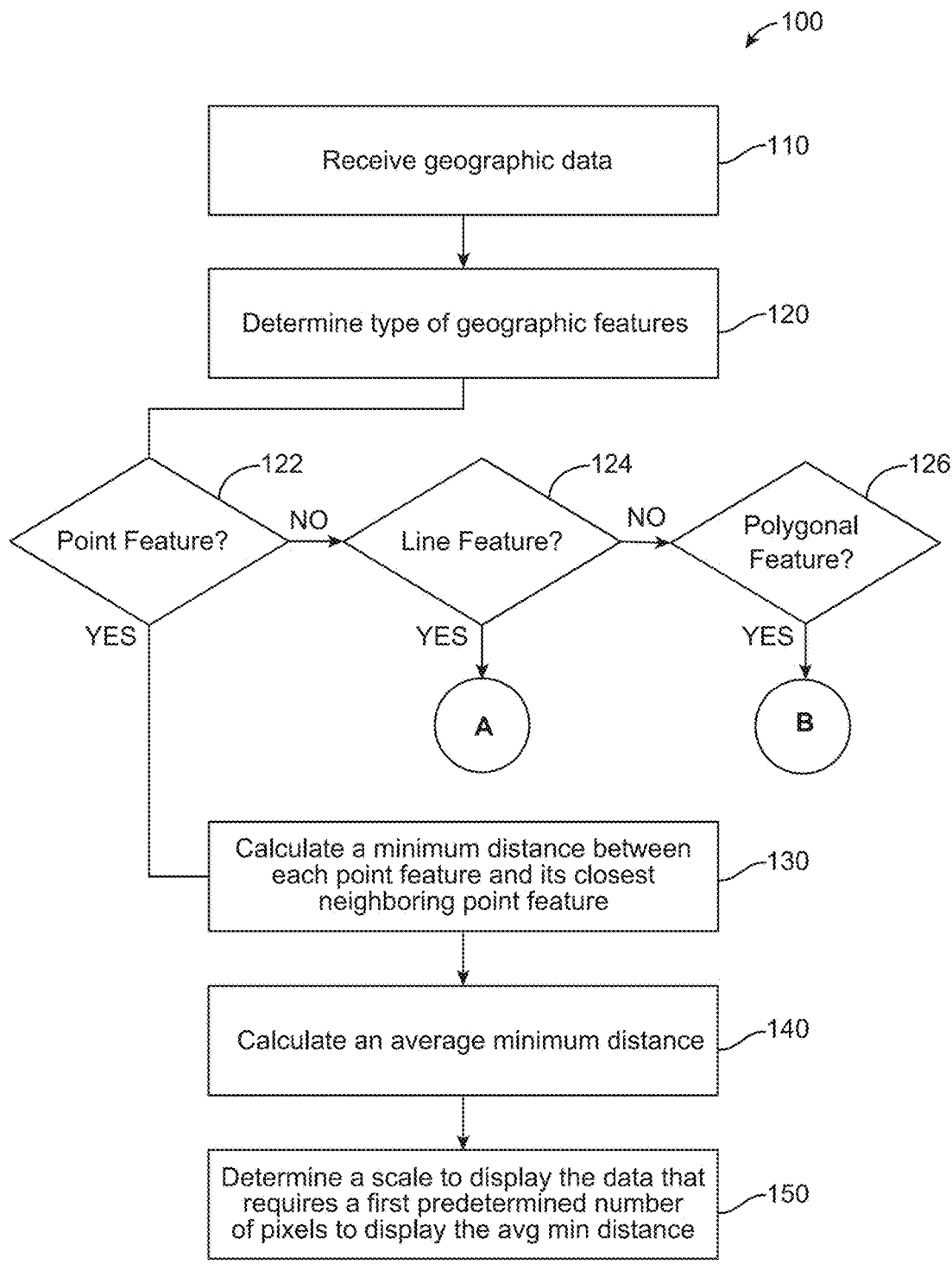
FIGS. 1A and 1B depict exemplary embodiments of a simplified flow diagram illustrating aspects of a method 100 for automatically setting a visible range in a digital map.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

Examples of the present disclosure are directed to, among other things, methods, systems, and principles of automated or "smart" cartography. Map authors may want to effortlessly create beautiful interactive and aesthetically pleasing maps and info-graphics on the fly, but do not have the knowledge, software skills, or familiarity with mapping interfaces in order to do so. Embodiments of the invention streamline this process in a number of ways by determining how much can we learn and infer about data automatically, and based on that analysis, how much of the map making process can be done for the user. Also, certain embodiments can determine a fewest number of steps between data and map, and in the process, common cartographic pitfalls can we eliminated from the user experience. Further, multiple map layers from different sources can be brought together for aesthetic continuity and content is appropriately presented for the scale, complexity, and nature of the data.

Some of the automated smart cartographic features embodied in the present invention are described below, including auto scaling a visible range in a map, setting smart default size ranges for proportional symbol maps, auto setting dot density parameters for multi-scale maps, selecting an appropriate thematic map using a data-driven workflow, creating bounded proportional sizes or unclassed color maps, and coordinating styling across layers so that map elements and color choices work well together Automatically Setting a Visible Range Interactive maps allow viewers to zoom in and out of a map, which provides great control over the presentation of a map, but also requires that the user mush contemplate the proper zoom levels to display their content. For example, a map of restaurant locations in Redlands, Calif. doesn't need to zoom out to the globe; the points would be too small to see and would have little to do with areas beyond Redlands. In other words, while a map viewer can zoom from globe to building, it doesn't make sense for most data to be displayed across all of those map scales. Setting the MAX and MIN scales at which a map layer becomes visible is known as Visible Range. Historically, this has been a manual and somewhat opaque process requiring trial-and-error. Embodiments of the invention include an algorithm that automatically determines a recommended visible range for the user through an analysis of the geographic properties of the data. This "smart default" of smart mapping creates a great solution without needing expertise or experience.

The idea behind the algorithm is to pick a scale where the layers look reasonably good. As a starting point, a scale can be defined as one that satisfies certain criteria. For point data, the on-screen distance between a given point and its closest neighbor should be at least 12 pixels (px), which can be configurable, according to certain embodiments of the invention. For each point, a distance between that point and its closest neighboring point can be measured, typically in map units (i.e. minDistance)(step 1). Next, an average of the minDistance values of all (or some) points is calculated (i.e., avgMinDistance)(step 2). Finally, a scale in, e.g., an AGOL basemap tiling scheme needing at least 12 px to display the avgMinDistance is determined (step 3). Other pixel minimums can be used, as would be appreciated by one of ordinary skill in the art.

For lines, the length can be defined as the distance between the first and last points of the line. In some cases, the screen length of an average line may be set to be at least 30 px, which can be configurable, according to certain embodiments of the invention. For each line, its length may be calculated in map units (step 1). Next, an average length is calculated (step 2). The average length may be an average of all of the lines or a subset thereof. Finally, a scale that would need at least 30 px to display the average length is found (step 3). Other pixel lengths are possible, as would be appreciated by one of ordinary skill in the art.

For polygons, the bounding box of an average polygon may be at least 15 px by 15 px, which may be configurable, according to certain embodiments of the invention, however other tolerances are possible. For each polygon, a size may be measured in map units (step 1). The size of a polygon can be measured using equation 1 below:

$$\text{Size} = (\text{extentWidth} + \text{extentHeight})/2 \qquad (1)$$

Next, the average size is calculated (step 2). The average size may be an average of all of the polygons of a subset thereof. Finally, a scale that would need at least 15 px to display the average size is determined (step 3). Other pixel sizes may be used, as would be appreciated by one of ordinary skill in the art. The distance, length and size calculations may be performed, for example, on a sample of 500 random features. The sample size may be user configurable.

In addition to suggesting a suitable minScale, embodiments of the invention include an algorithm that can suggest a location to center the map at. This may be highlighted in a test map using a cross-hair. This location may be calculated using average x and y coordinates of all the sampled features (or a subset thereof). A reference map width may be used to calculate an extent from the scale and location calculated above (e.g., initialExtent). In some cases, a constant (e.g., 1280 px) can be used instead of using the current map width. This may apply in implementations that may not depend on a map width.

Certain embodiments may implement changes to the minScale logic where a suggested scale is refined further if the computed scale+center (i.e. extent) completely contains the layer's full extent. In such cases, the map can be zoomed in couple more zoom levels. In some embodiments, a suggested center may be adjusted so that there is at least one feature visible. The algorithm may depend on map width and height with these changes and may be held constant at, e.g., 1280 px and 800 px, instead of using a current map size. Further, larger generalization tolerances may be used when sampling features to reduce network latency issues.

In some embodiments, a maxScale may be calculated using the following cartographical rules: a) for points: the distance between the two closest points is typically not larger than 25% of the map width; b) for lines: the length of the smallest line is typically not larger than 25% of the map width; and c) for polygons: the size of the smallest polygon is typically not larger than 50% of the map width. An exemplary default map width can be set to 1280 px.

Figure 1B:
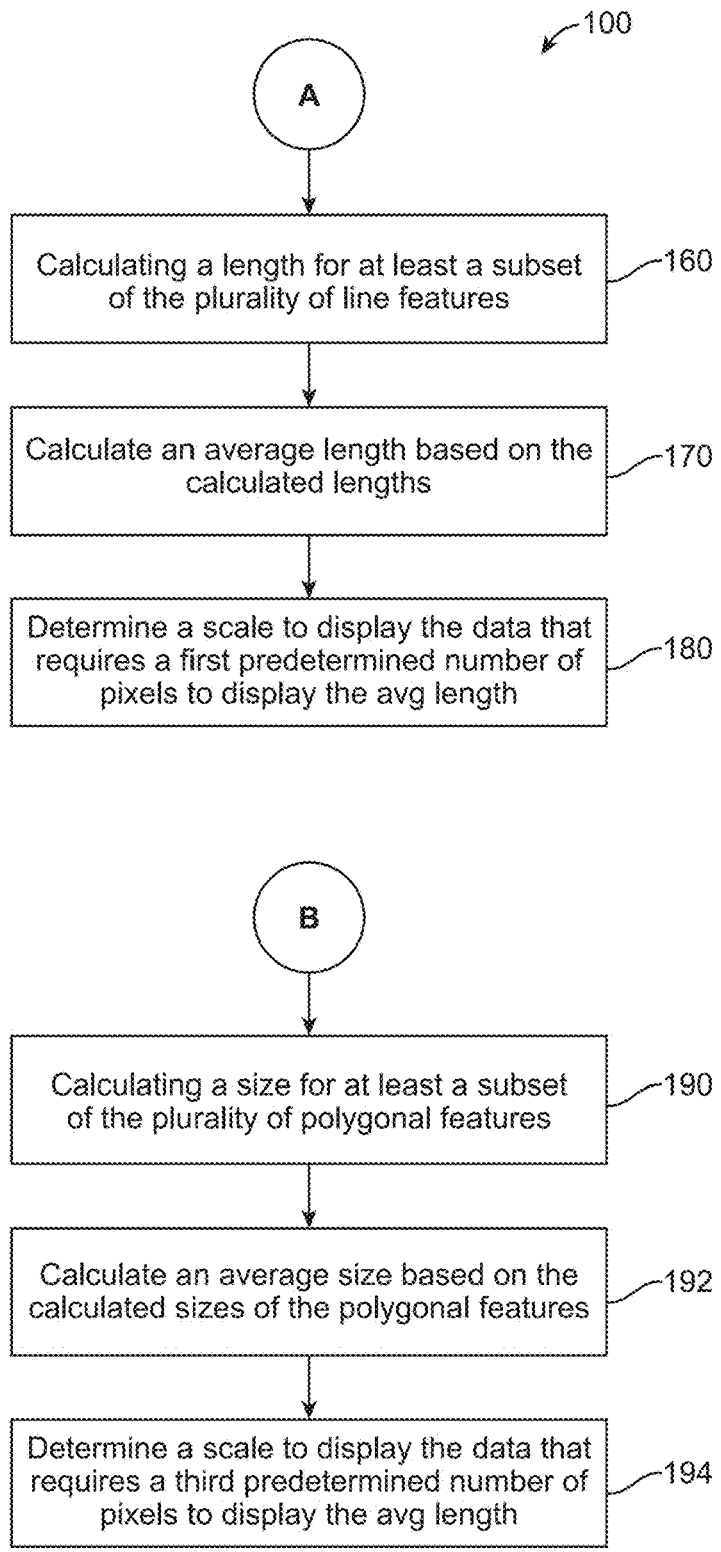

FIGS. 1A and 1B depict exemplary embodiments of a simplified flow diagram illustrating aspects of a method 100 for automatically setting a visible range in a digital map, as further discussed above. Method 100 can be performed by processing logic that may comprise hardware (e.g., circuitry, dedicate logic, etc.), software (e.g., executed on a general purpose computing system or a dedicated machine), firmware (e.g., embedded software), or any combination thereof. In some embodiments, method 100 can be performed by elements of system 900 or system 1000 of FIGS. 9-10.

It should be appreciated that the specific steps illustrated in FIGS. 1A-1B provide a particular method of automatically setting a visible range in a digital map, according to an embodiment of the present invention. Other sequences of steps may also be performed according to alternative embodiments. In certain embodiments, method 100 may perform the individual steps in a different order, at the same time, or any other sequence for a particular application. Moreover, the individual steps illustrated in FIG. 1 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method.

Automatically Setting Dot Density Parameters for Multi-Scale Maps

Dot density maps are considered one of the harder thematic maps to make well because the size of the dots (in pixels) and the dot values (e.g., 1 dot=X people) interact in a complicated way visually and every dataset is a unique challenge. It can be even worse when making dot density maps that have to zoom in and out across a range of scales. As such, there are no simple 'rules' for what dots sizes or dot values work best for what kinds of data or geographies. It's a visual problem that historically had to be solved by experts using trial-and-error. Embodiments of the present invention take the guesswork out of this by automatically calculating the correct dot values and dot sizes for data (e.g., GIS data) across a range of map scales.

To illustrate a typical problem when creating a dot map across multiple scales, consider a population map of the United States with county data totaling 3300 counties. Some counties may have 50 people, and other have millions (e.g., Manhattan). Therefore, showing where people live using county data with the total population of each county would require a range of at least 50-1M. This could drastically skew the number of people (in this example) represented by one dot. In some embodiments, an optimal reference includes the densest area in the map where dots are so clustered so that they touch with little to no white space between them. At this location, the value of one dot is determined by dividing the population (i.e., the data values) by the number of dots in that area (e.g., polygon).

In certain embodiments, a method for creating a dot map may include receiving, by a processor, a dataset including a plurality of data values, each data value corresponding to a certain location on a geographic map, determining a location on the geographic map having a densest distribution of data values within the location's boundaries, determining a number of dots needed to substantially fill the location without overlapping dots, and calculating a number of data values per dot based on a total number of data values and the number of dots at the location. In some cases, the sample size is limited to a smaller range (e.g., 95 percentile) to remove outliers and reduce the number of data points (e.g., people) per dot for an aesthetically improve and more readable dot map. In some embodiments, dot sizes can range from 1 pixel to 4 pixels in size. Using this method, the dot map may be scalable from up to six zoom levels, where the number of data values per dot does not change as the dot map is scaled between zoom levels. For example, as a user switches from a first scale to a zoomed-in second scale, the size of the dots increase, but the representation (e.g., 1 dot=1000 people) remains the same.

In another embodiment, the smart mapping algorithm determines a best default setting in the following example: First, a zoom level within the scale range is chosen. In some embodiments, the maximum scale is chosen (where you get the largest dot size) to determine dot value, and is expanded it to other scales.

Next, for this zoom level, we ask "if I want 2 pixels to be the default dot size, what should the dot value be?" A proper dot value should a round number to cause dots to coalesce in the densest polygon. For example, to fill a 30-square-pixels polygon with population 150,000, the dot value will be "1 dot=10,000 people." One way to find the densest polygon is to query the feature layer to get all geometries. If or when the number of features gets to be too many, only a portion of the features may be selected. In some cases, the absolute densest polygon could be an outlier. Rather than solely looking at the absolute densest, it may be more useful to consider multiple densest polygons (e.g. average of the top 5% or 10%). Sometimes, a max value is not a good estimator of max density.

Finally, the dot size for other visible scales are adjusted. The dot size doubles once every two zoom levels, while the dot value is consistent. For example, if we determine level 7-level 10 is the best range to show the data, the dot value and dot size will vary with scale, as shown in FIG. 3A. In some implementations, the layer is visible only from level 7 to level 10 by default. If a user changes the visible range broader, you just copy the size/value at the max/min scale all the way up/down, as shown in FIG. 3B.

Varying the dot size instead of the dot value works well in practice. This keeps the user experience simple for people who don't know how to draw dots. The author (map maker/editor) can still be free to set either dot value or dot size in a manual control setting. But for the initial view of the data, an appropriate dot value (which is held constant across zoom levels, initially) and dot size (which is adjusted on-the-fly for the authors across zoom levels) are calculated. In some cases, a user can opt to hold a size or value constant.

In certain embodiments, the dot size may be limited between 1 px and 4 px. Typically, once the dots become much bigger than 4 pixels, people tend to mistake them for specific locations, place marks, etc., and not a random density cloud. The progression of dots sizes as a user zooms in from full spatial extent ("see all of the data"), the dot sizes may increase, for example, in a 1, 1, 2, 3, 4, 4 pixel gradient across the 6 default zoom levels. This default mode can be manually set to per user preference. That is, the user can change the dot value, dot size, and number of zoom levels, etc., as needed. However, research indicates that 6 zoom levels is enough for most dot density maps because zooming in too far shows too few dots and may lose the "density" perspective.

Dots are typically 1 pixel and 2 pixels. Squares are typically used because they draw much more quickly and usually cannot be distinguished from circles. When the dots grow to become 3 and 4 pixels large, circles can be used. Performance hit seems to be minimal because, by that point, the user may have zoomed in far enough that there are few overall dots to render in the browser (or local application, etc.). Also, a 1 px circle is actually smaller than one pixel, and therefore produces some fuzziness on the map.

"Bounded Proportional Sizes" and "Bounded Unclassed Color Ramps"

Historically, cartography relied on data classification where observations are grouped into ranges (0-10, 10-20, 20-30, . . . ). This may obscure a great amount of important detail (e.g., most data values between 6 and 7) and so "unclassed" maps have been popular for many years as an alternative. However, unclassed maps may be overly influenced by outliers, thus creating maps which reveal almost no visibly useful data. Embodiments of the invention have solved this problem by using a "bounded proportional" and "bounded continuous color" approach to applying size or color to maps in a way that reveals the pertinent parts of data automatically. Some implementations are able to display outliers but are not overly influenced by them.

Figure 6:
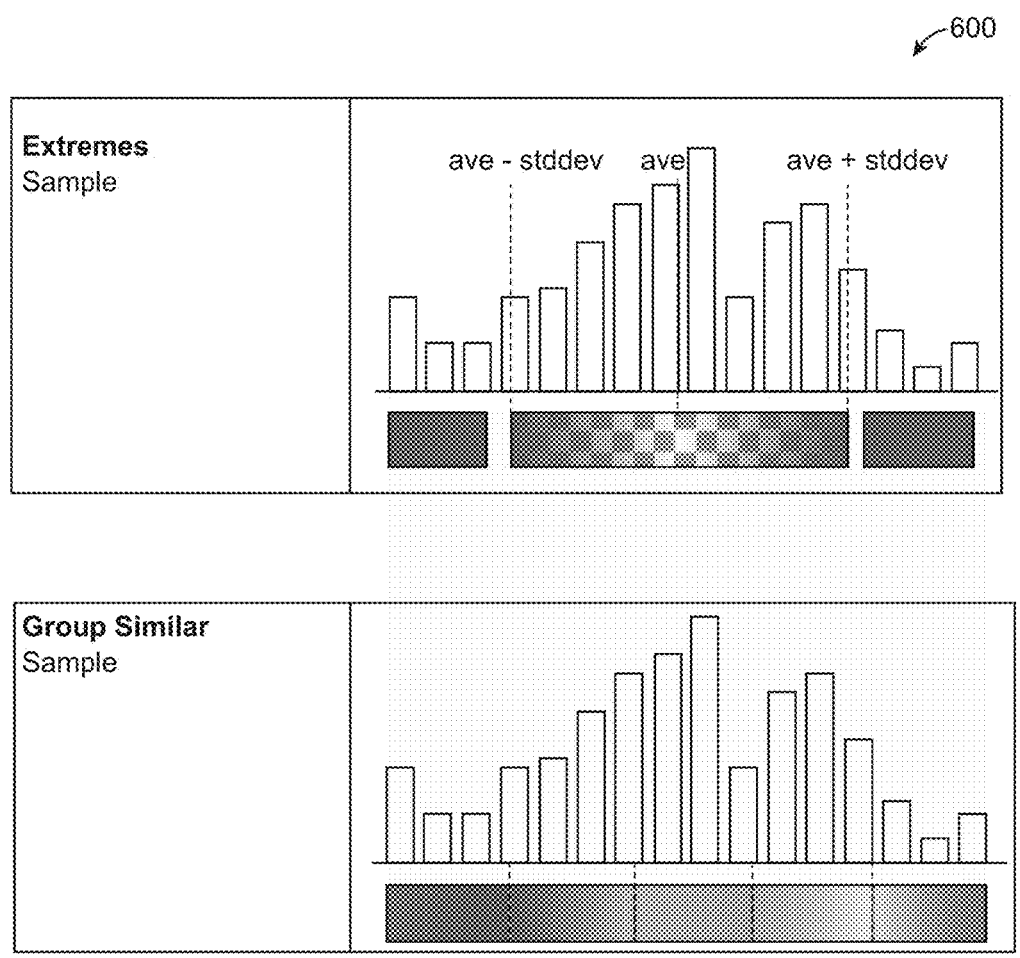
FIG. 6 illustrates color maps that show extremes and grouped similar data values, according to certain embodiments of the invention.

In some embodiments, there are two components to this process. The first component is automatically defining the initial settings of how the color ramp (or size ramp) is uniquely applied to the layer based on the data. The second component is giving the user intuitive controls to fine tune how the color is mapped to a specific data value. FIG. 5 illustrates several different representations of color maps 500 including sequential—linear (top most image), diverging, and highlighting (bottom most image), according to certain embodiments of the invention. FIG. 6 illustrates color maps that show extremes (top image) and grouped similar data values (bottom image), according to certain embodiments of the invention.

In some embodiments, in order to determine an optimal default color representation, the best data range is determined. This may include querying the feature layer to get statistics including min, max, average and standard deviation. Color variation is only applied to features between an upper bound and a lower bound. In one example, a default upper bound is average+1 standard deviation, and a default lower bound is average−1 standard deviation. If average+1 standard deviation is greater than max, max will be the upper bound. If average−1 standard deviation is less than min, min will be the lower bound. Features above the upper bound will get the same color, and those below the lower bound too. Next, ramp colors are mapped to feature values. Similar methods can be used for bounded proportional sizes.

Figure 7:
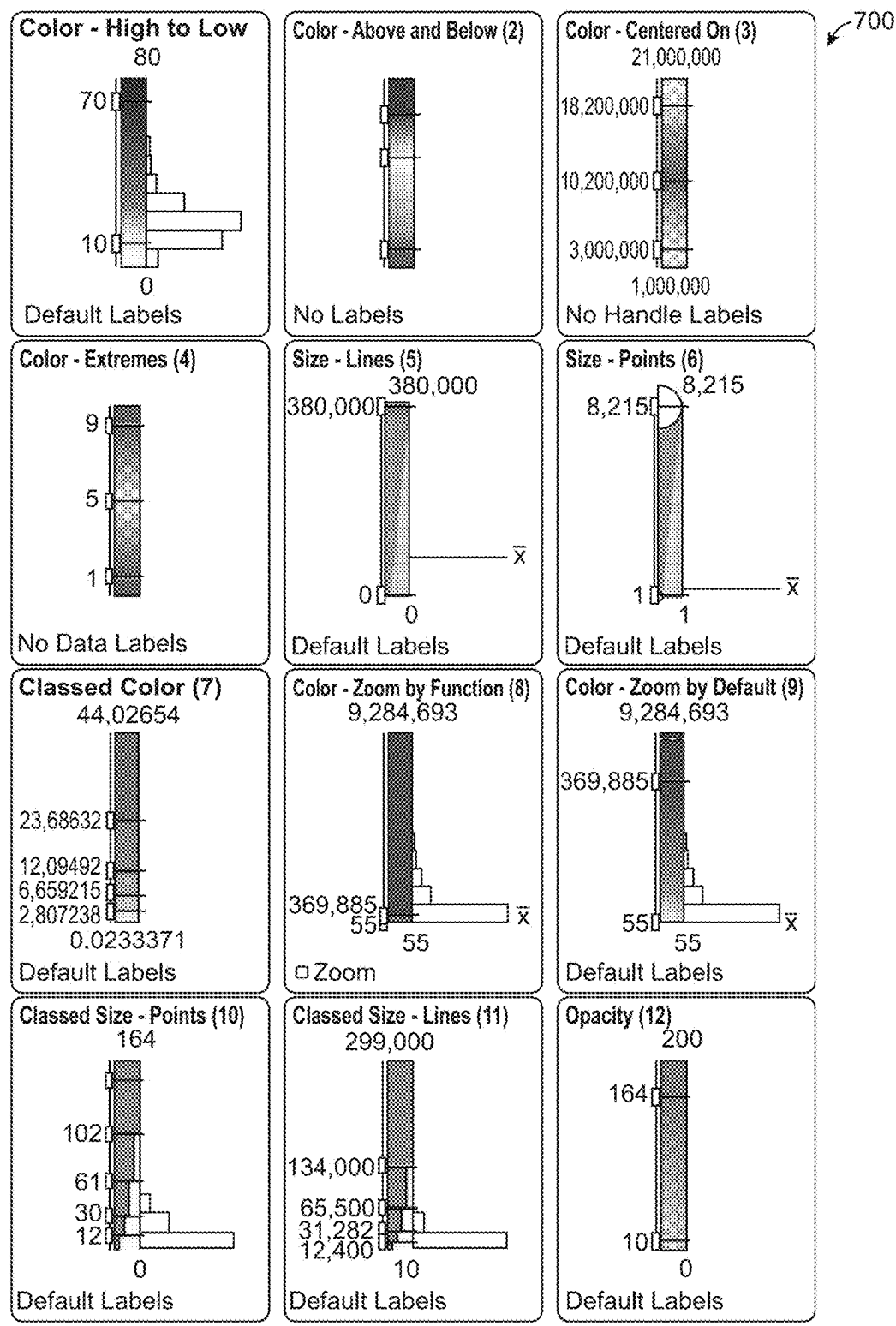
FIG. 7 illustrates a number of possible control configurations (handles) for a color map, according to certain embodiments of the invention.
Figure 7:
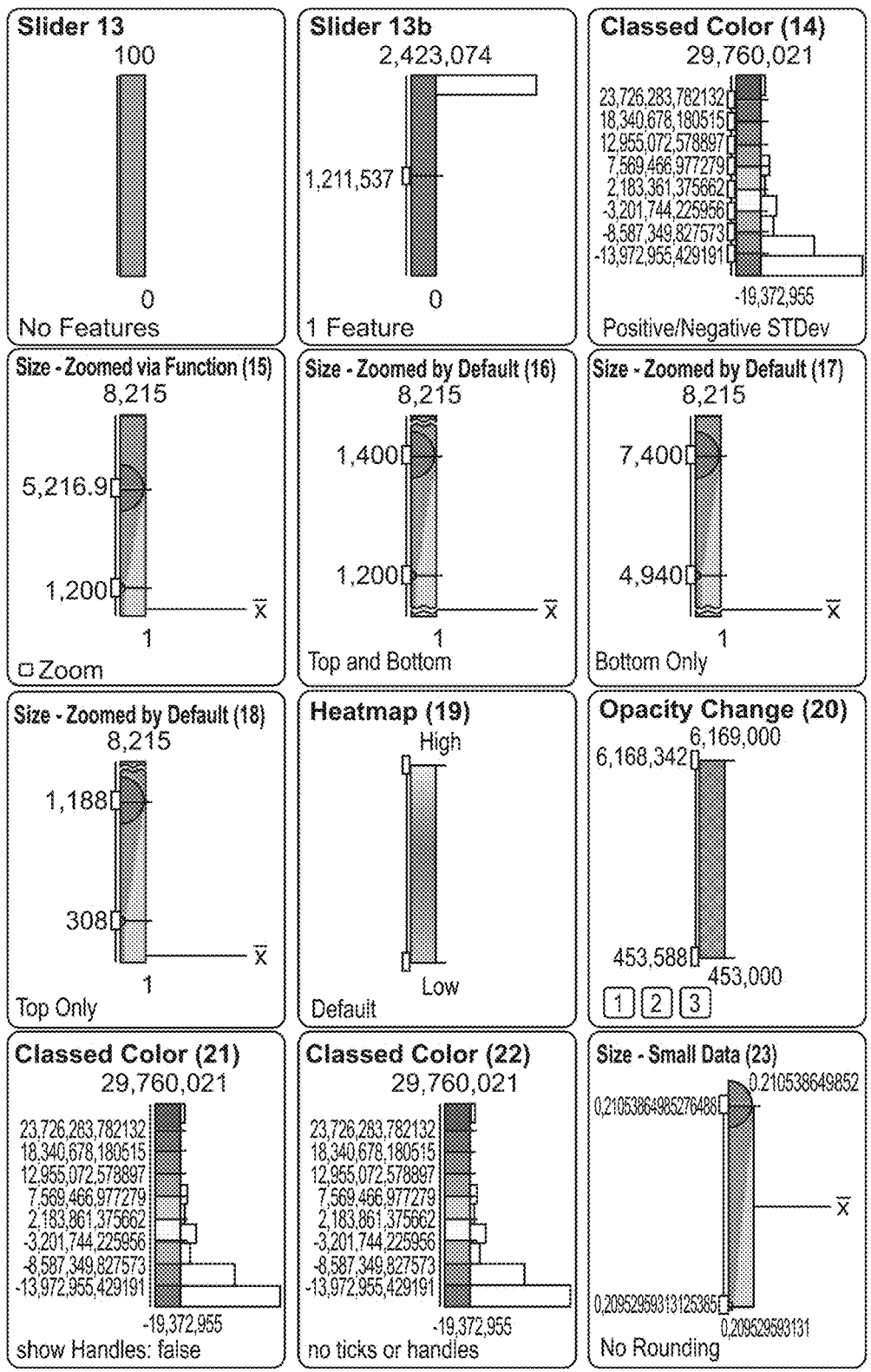

In certain embodiments, intuitive controls can be introduced to fine tune how the color is mapped to a specific data value. Examples of some of the possible control configurations are shown in FIG. 7. The controls (i.e., handles) in each case are preset based on the dataset, but are manually configurable.

Coordinated Styling Across Layers

Figure 8:
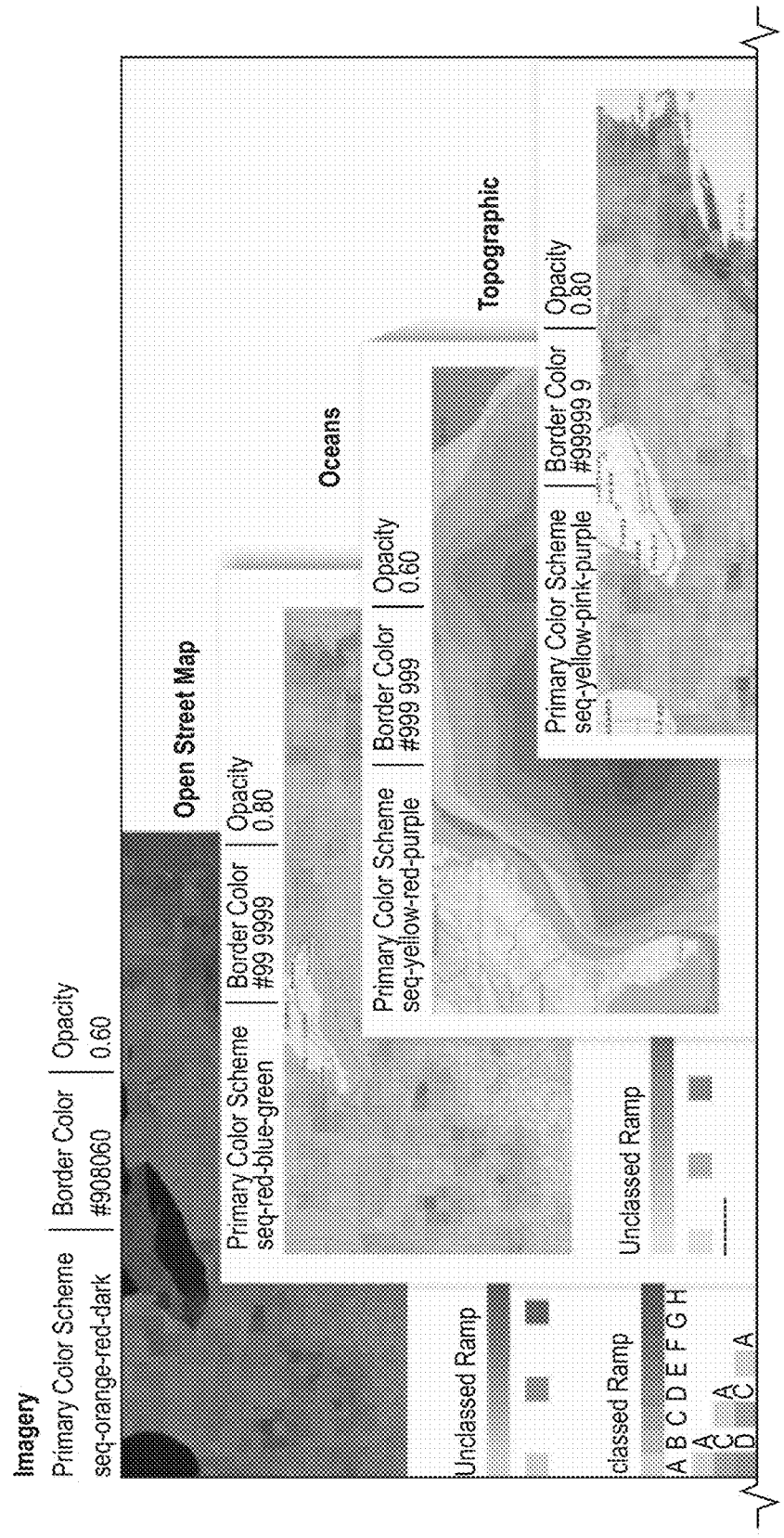
FIG. 8 illustrates a number of maps featuring coordinated layers on respective base maps, according to certain embodiments of the invention.
Figure 8:
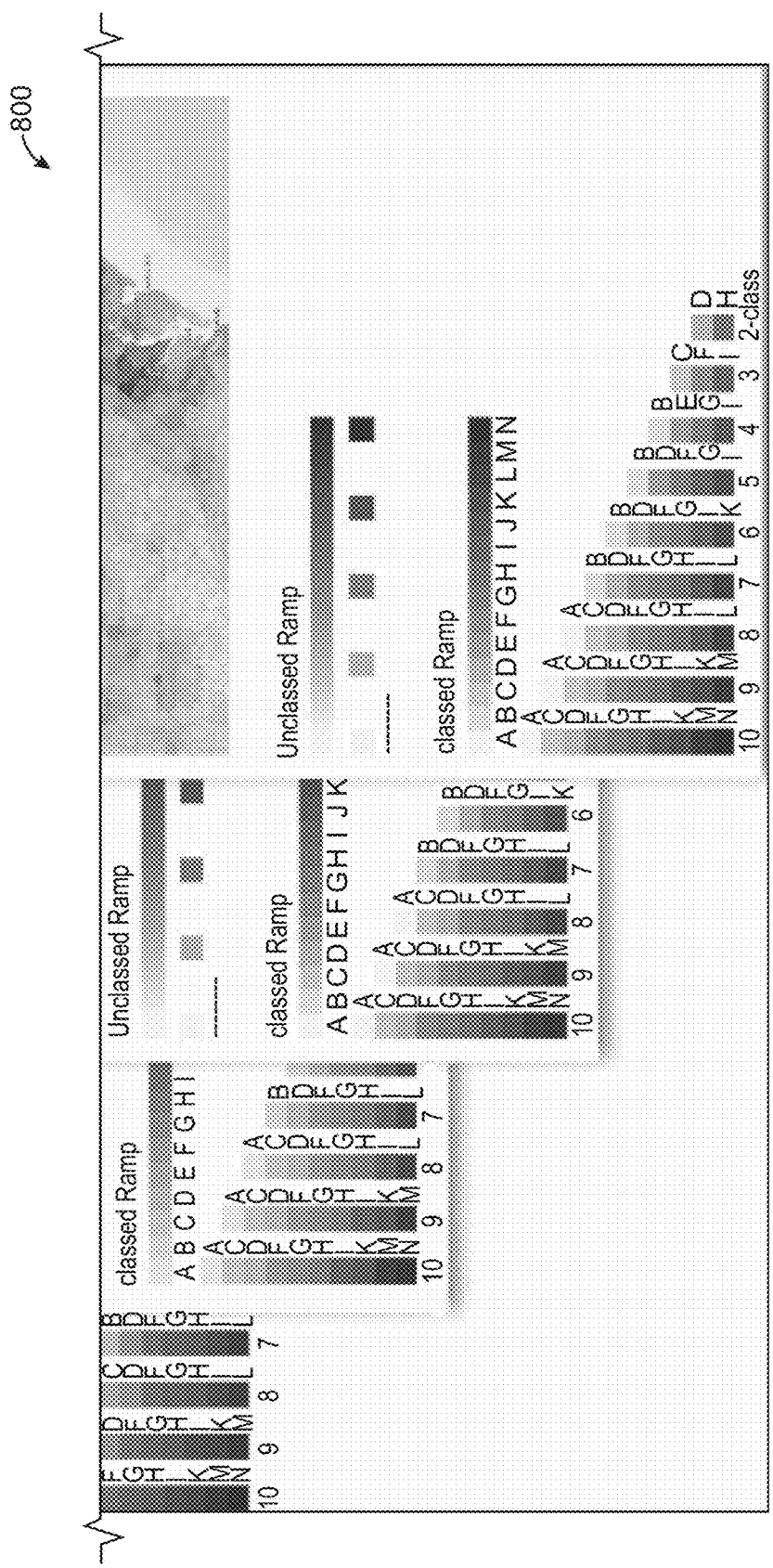

Since modern GIS and Web Maps may be composed of many layers that overlay, it is important for the different layers to visually harmonize, look like they were designed to work together, and remain legible even under reduced transparency (for example, so you can see layers beneath other layers). This is often called a "mash-up" where multiple data sources are brought together, often on the fly, and have to work together. In certain embodiments, custom map specs coordinate the styling of thematic data (e.g., colors, line weights, opacity amounts) and are automatically coordinated with a basemap tiles. Rather than make the map author do all of the tedious work of picking and styling each of these small elements of a map (which can be done manually), an automatically generated pre-packaged and aesthetically pleasing default map is created (see, e.g., FIG. 8). Thus, thematic data in additional layers will "harmonize" with the base map. In some cases, any layer can be designated a base map such that the other layers are harmonized to that specific layer.

In some embodiments, a method of harmonizing thematic data for multiple layers in a geographically-based map includes receiving base map data, the base map data being a first layer and including thematic data, wherein the thematic data includes one or more of a color scheme, line weights, opacity, text font(s), and text size(s), receiving data for one or more additional layers, each additional layer including thematic data, changing the thematic data for the one or more additional layers to match the thematic data of the base map, and superimposing the base map and the one or more additional layers. In some cases, thematic data associated with the one or more additional layers that is not found in the base map is not changed.

Thus, certain embodiments can automatically pair the right styling and design choices across multiple layers since most maps these days are "mash-ups". Other than experts, few people have the knowledge or time to make these multiple layer maps work together visually.

Sample Embodiments of System Architectures

Figure 9:
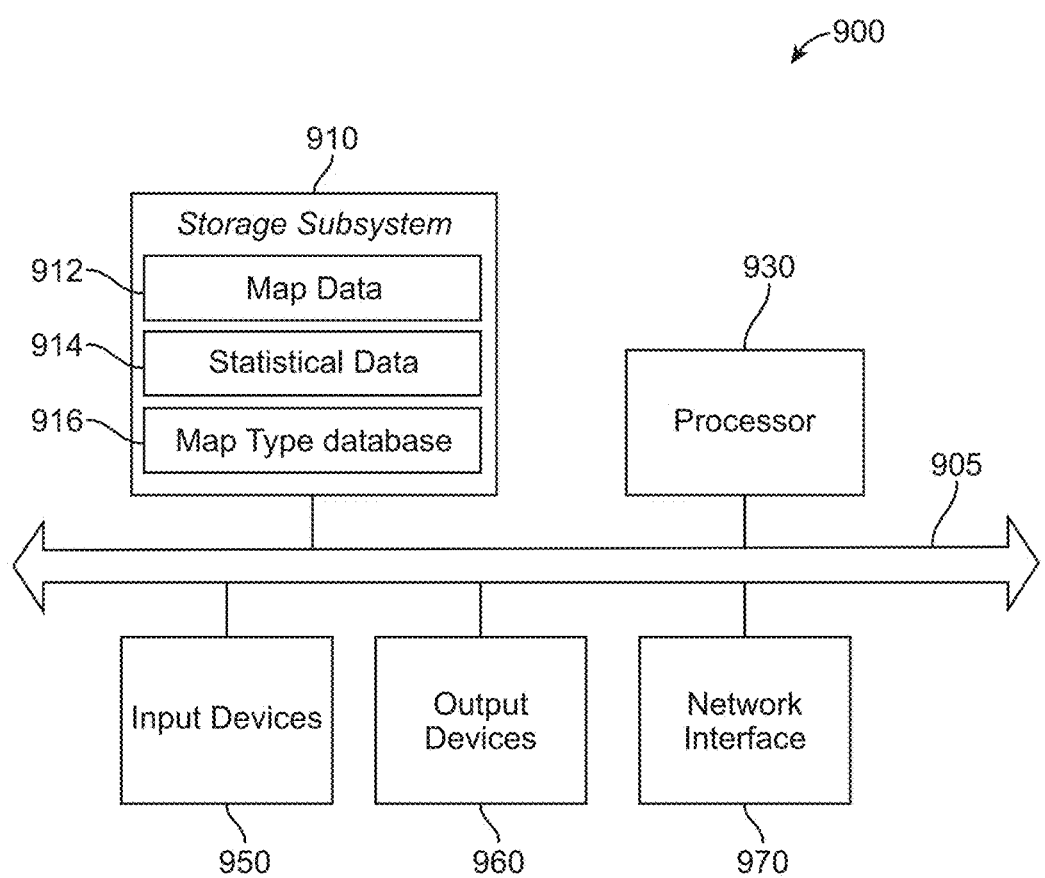
FIG. 9 illustrates a computer system 900 for implementing smart cartography, according to certain embodiments of the invention.

FIG. 9 illustrates a computer system 900 for implementing smart cartography, according to certain embodiments of the invention. The image processing, algorithms, and methods described herein (e.g., FIGS. 1-8) can be implemented with a computer system such as computer system 900 shown here. Computer system 900 can be implemented as any of various computing devices, including, e.g., server(s), a desktop or laptop computer, tablet computer, smart phone, personal digital assistant (PDA), or any other type of computing device, not limited to any particular form factor. Computer system 900 can include processing unit(s) 930, storage subsystem 910, input devices 950 (e.g., keyboards, mice, touchscreens, etc.), output devices 960 (e.g., displays, speakers, tactile output devices, etc.), network interface 970 (e.g., RF, 4G, EDGE, WiFi, GPS, Ethernet, etc.), and bus 905 to communicatively couple the various elements of system 900 to one another.

Processing unit(s) 930 can include a single processor, multi-core processor, or multiple processors and may execute instructions in hardware, firmware, or software, such as instructions stored in storage subsystem 910. The storage subsystem 910 can include various memory units such as a system memory, a read only memory (ROM), and permanent storage device(s) (e.g., magnetic, solid state, or optical media, flash memory, etc.). The ROM can store static data and instructions required by processing unit(s) 930 and other modules of the system 900. The system memory can store some or all of the instructions and data that the processor needs at runtime.

In some embodiments, storage subsystem 910 can store one or more of data or software programs to be executed or controlled by processing unit(s) 930, such as map data 912, statistical data 914, or map type data 916, or other suitable database or repository, as may be used in the aforementioned embodiments. As mentioned, "software" can refer to sequences of instructions that, when executed by processing unit(s) 930, cause computer system 900 to perform certain operations of the software programs. The instructions can be stored as firmware residing in read only memory and/or applications stored in media storage that can be read into memory for processing by processing unit(s) 930. Software can be implemented as a single program or a collection of separate programs and can be stored in non-volatile storage and copied in whole or in part to volatile working memory during program execution. From storage subsystem 910, processing unit(s) 930 can retrieve program instructions to execute in order to execute various operations (e.g., interpolations) described herein.

It will be appreciated that computer system 900 is illustrative and that variations and modifications are possible. Computer system 900 can have other capabilities not specifically described here in detail (e.g., GIS technologies). Further, while computer system 900 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

It should be appreciated that computer system 900 is illustrative and not intended to limit embodiments of the present disclosure. Many other configurations having more or fewer components than system 900 are possible.

Figure 10:
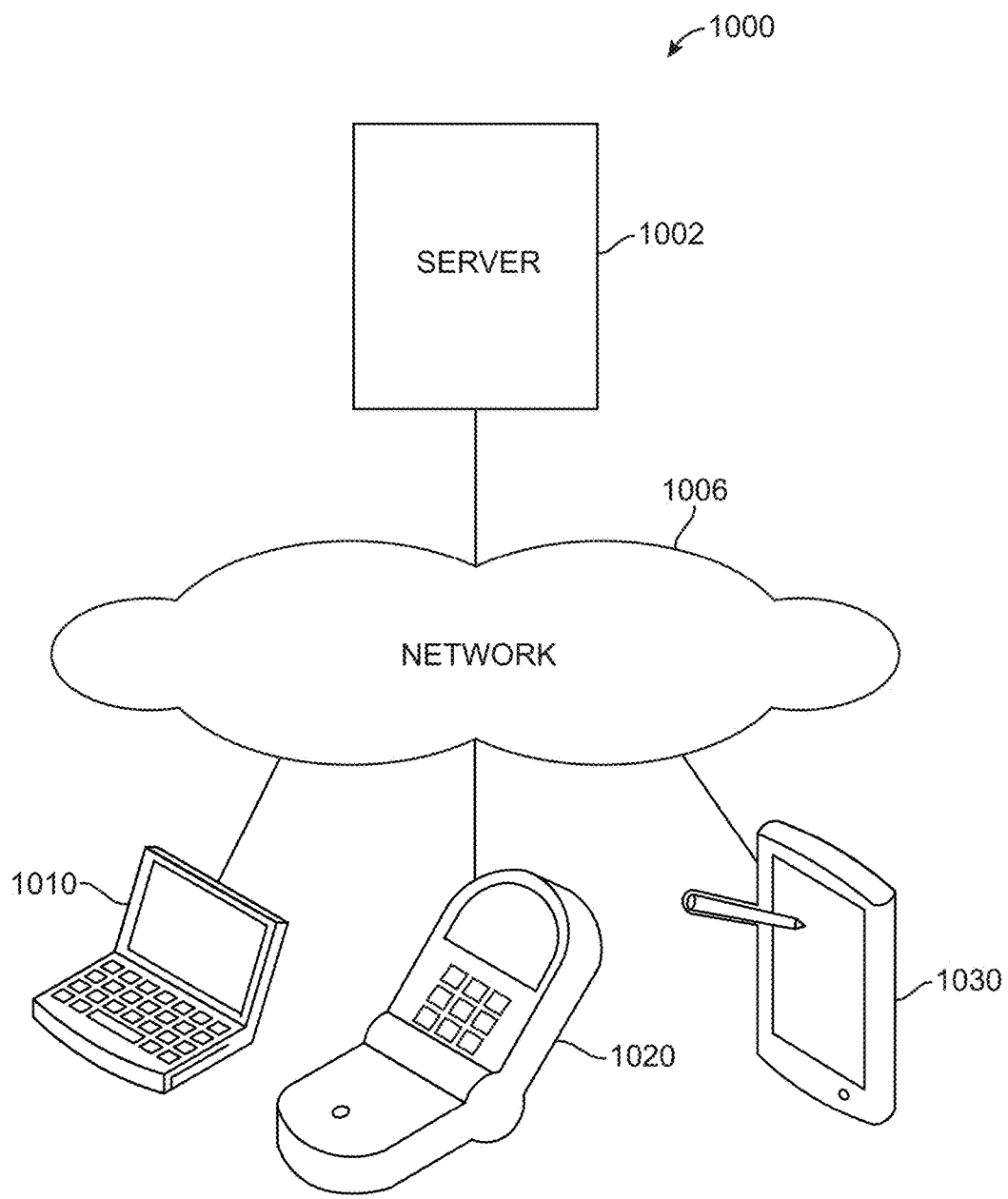
FIG. 10 depicts a simplified diagram of a distributed system for providing a system and method for smart cartography, according to certain embodiments of the invention.

Aspects of system 900 may be implemented in many different configurations. In some embodiments, system 900 may be configured as a distributed system where one or more components of system 900 are distributed over one or more networks in the cloud. FIG. 10 depicts a simplified diagram of a distributed system 1000 for providing a system and method for smart cartography, according to an embodiment of the invention. In the embodiment depicted in FIG. 10, system 1000 is provided on a server 1002 that is communicatively coupled with one or more remote client devices 1010, 1020, 1030 via network 1006.

Network 1006 may include one or more communication networks, which could be the Internet, a local area network (LAN), a wide area network (WAN), a wireless or wired network, an Intranet, a private network, a public network, a switched network, or any other suitable communication network or combination thereof. Network 1006 may include many interconnected systems and communication links including but not restricted to hardwire links, optical links, satellite or other wireless communications links, wave propagation links, or any communication protocol. Various communication protocols may be used to facilitate communication of information via network 1006, including but not restricted to TCP/IP, HTTP protocols, extensible markup language (XML), wireless application protocol (WAP), protocols under development by industry standard organizations, vendor-specific protocols, customized protocols, and others as would be appreciated by one of ordinary skill in the art. In the configuration depicted in FIG. 10, aspects of system 800 may be displayed on any of client devices 1010, 1020, 1030.

In the configuration depicted in FIG. 10, system 900 is remotely located from client devices 1010, 1020, 1030. In some embodiments, server 1002 may perform the methods of determining (or interpolating) a population over a geographic area described herein. In some embodiments, the services provided by server 1002 may be offered as web-based or cloud services or under a Software as a Service (SaaS) model, as would be appreciated by one of ordinary skill in the art.

Smart Default Size Ranges for Proportional Symbol Maps

When making maps that use proportional size symbols, authors typically need to set what the smallest and largest symbols sizes should be. If symbols are too small they can't be seen; too large and they overlap and become unreadable. Embodiments of the present invention include automated processes to replace what used to be a trial-and-error manual process by analyzing the geographic properties of data (for example, the average size of certain locations such as counties, counties, zip codes, etc., in the data) and analyzing the statistical properties of thematic data (e.g., income, or life expectancy).

Figure 11:
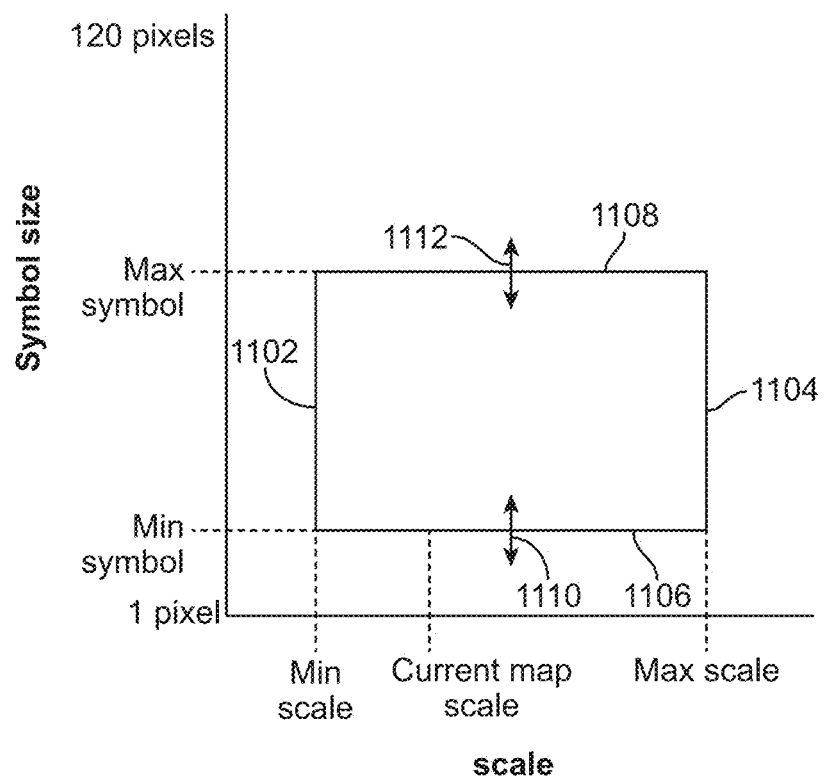
FIG. 11 is a diagram of a prior art method of setting minimum and maximum symbol sizes for different map scales, or zoom levels.

FIG. 11 is a diagram of a prior art method of setting minimum and maximum symbol sizes for different map scales, or zoom levels. Line 1102 is the minimum map scale or zoom level, and line 1104 indicates the maximum map scale or zoom level. Line 1106 indicates the minimum feature size, and line 1108 indicates the maximum feature size. As can be seen, the minimum and maximum feature sizes remain constant at different zoom levels. The actual feature sizes at different zoom levels may vary according to one of the prior art methods described above, such as proportional to the map scale or zoom level. However, this variation is within the same minimum and maximum limits, which can constrain the variation between symbol sizes at a particular zoom level. A prior art way to address this it to allow manual variation of the minimum and maximum limits by a user, as indicated by arrows 1110 and 1112.

Figure 2:
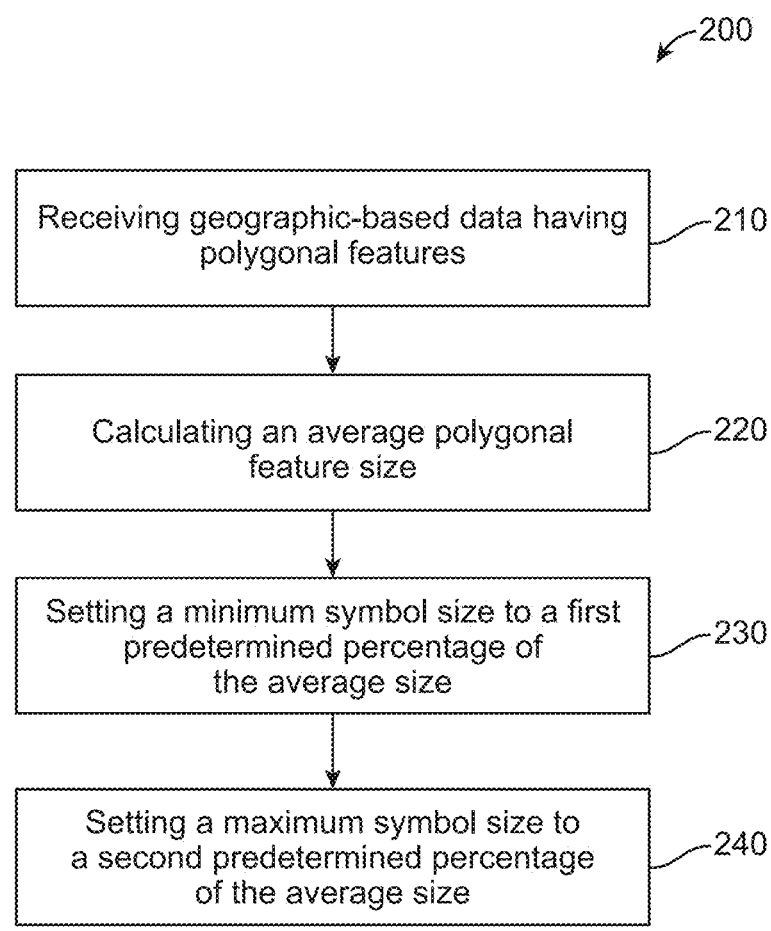
FIG. 2 depicts a simplified flow diagram illustrating aspects of a method 200 for proportionally sizing symbols on a map, according to certain embodiments of the invention.

FIG. 2 depicts a simplified flow diagram illustrating aspects of a method 200 for proportionally sizing symbols on a map, according to certain embodiments of the invention. Method 200 can be performed by processing logic that may comprise hardware (e.g., circuitry, dedicate logic, etc.), software (e.g., executed on a general purpose computing system or a dedicated machine), firmware (e.g., embedded software), or any combination thereof. In some embodiments, method 100 can be performed by elements of system 900 or system 1000 of FIGS. 9-10.

Method 200 begins with receiving, by a processor, geographic-based data having one or more polygonal features (step 210). The processor calculates an average polygonal feature size for at least a subset of the one or more polygonal features (Step 210). In some cases, the full data set may be used (i.e., average all polygonal features), however any sampling number may be used to determine the average polygonal size. At step 230, a minimum symbol size is set to a first predetermined percentage of the average feature size, where the minimum symbol size is less than 100% of the average feature size. In exemplary embodiments, the minimum size is approximately 25% of the average polygonal feature size at a current map scale. In some non-limiting embodiments, ranges may range from a minimum of 4 px to a maximum of 16 px, however other ranges may be used. At step 240, a maximum symbol size is set to a second predetermined percentage of the average feature size, where the minimum symbol size is greater than 100% of the average feature size. In exemplary embodiments, the maximum size is approximately 125% of the average polygonal feature size at a current map scale. In some non-limiting embodiments, ranges may range from a minimum of 50 px to a maximum of 80 px, however other ranges may be used. The average feature size can be calculated using all features in the layer in memory—not just features intersecting the current extent.

It should be appreciated that the specific steps illustrated in FIG. 2 provides a particular method of proportionally sizing symbols on a map, according to an embodiment of the present invention. Other sequences of steps may also be performed according to alternative embodiments. In certain embodiments, method 200 may perform the individual steps in a different order, at the same time, or any other sequence for a particular application. Moreover, the individual steps illustrated in FIG. 2 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method.

The symbols can be many things, such as lettering for labels, numbers, arrows or direction indicators or other icons, circles, bar graphs, etc. that can represent data such as income, life expectancy, population, sales, etc. Also, the polygon features can be a variety of features, such as states, counties, cities, zip codes, areas of common vegetation (e.g., forests, deserts), bodies of water, roads, buildings, etc.

Figure 12:
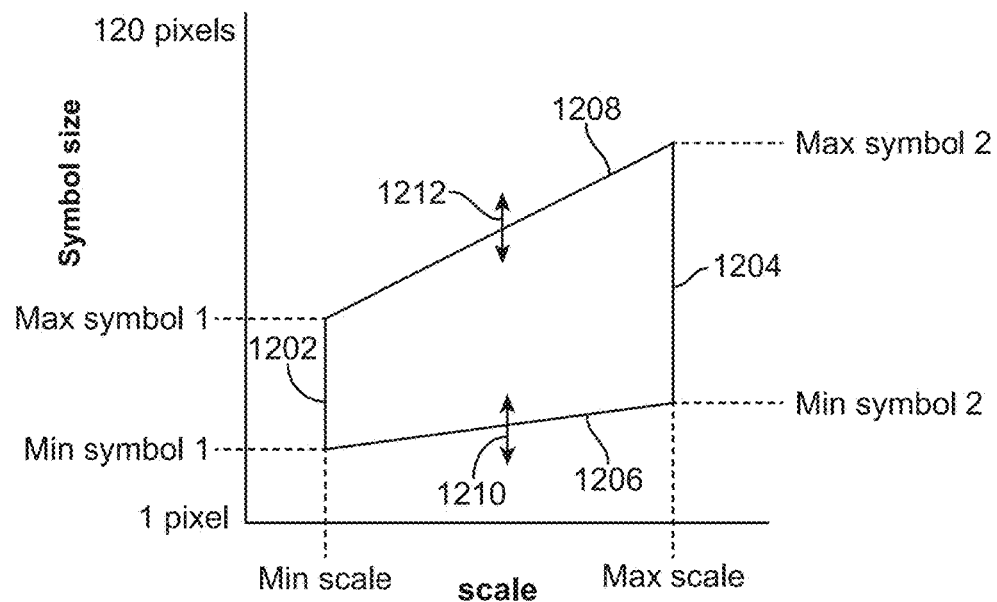
FIG. 12 is diagram illustrating a method of setting minimum and maximum symbol sizes for different map scales, or zoom levels based on a relationship of symbol size to feature size, according to certain embodiments of the invention.

FIG. 12 is diagram illustrating a method of setting minimum and maximum symbol sizes for different map scales, or zoom levels based on a relationship of symbol size to feature size, according to certain embodiments of the invention. Line 1202 is the minimum map scale or zoom level, and line 1204 indicates the maximum map scale or zoom level. Line 1206 indicates the minimum feature size, and line 1208 indicates the maximum feature size. As can be seen, the minimum and maximum feature sizes vary at different zoom levels. The user can manually vary the height of the entire sloped limit line, as indicated by arrows 1210 and 1212.

Figure 13:
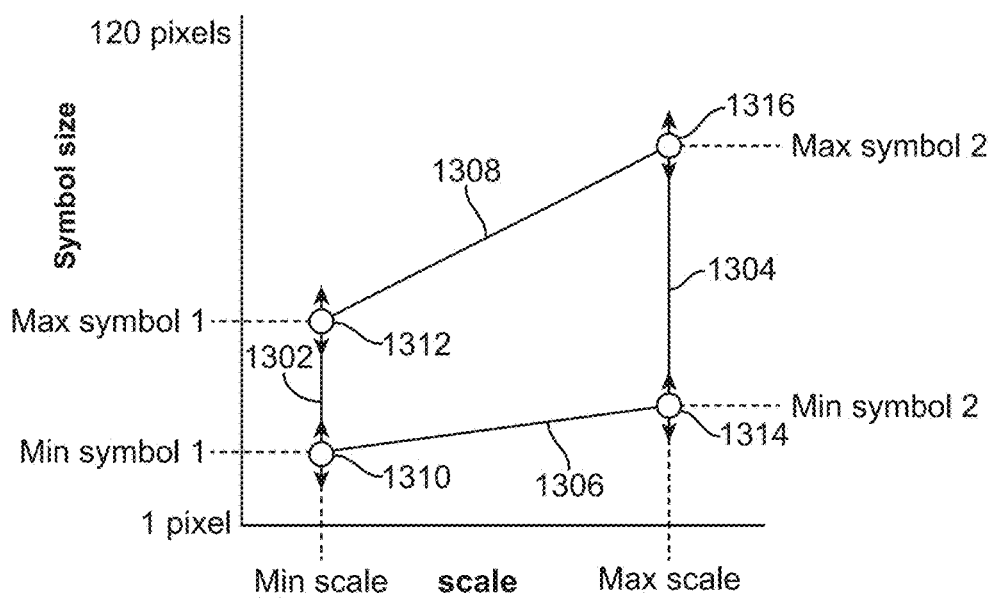
FIG. 13 is the diagram of FIG. 3 showing user adjustability of the minimum and maximum values at the ends of the scale, according to certain embodiments of the invention.

FIG. 13 is the diagram of FIG. 12 showing user adjustability of the minimum and maximum values at the ends of the scale, according to certain embodiments of the invention. Line 1302 is the minimum map scale or zoom level, and line 1304 indicates the maximum map scale or zoom level. Line 1306 indicates the minimum feature size, and line 1308 indicates the maximum feature size. As can be seen, the minimum and maximum feature sizes vary at different zoom levels. The user can manually vary the height of the end points of the sloped limit line, as indicated by arrows 1310, 1312, 1314 and 1316.

Figure 14:
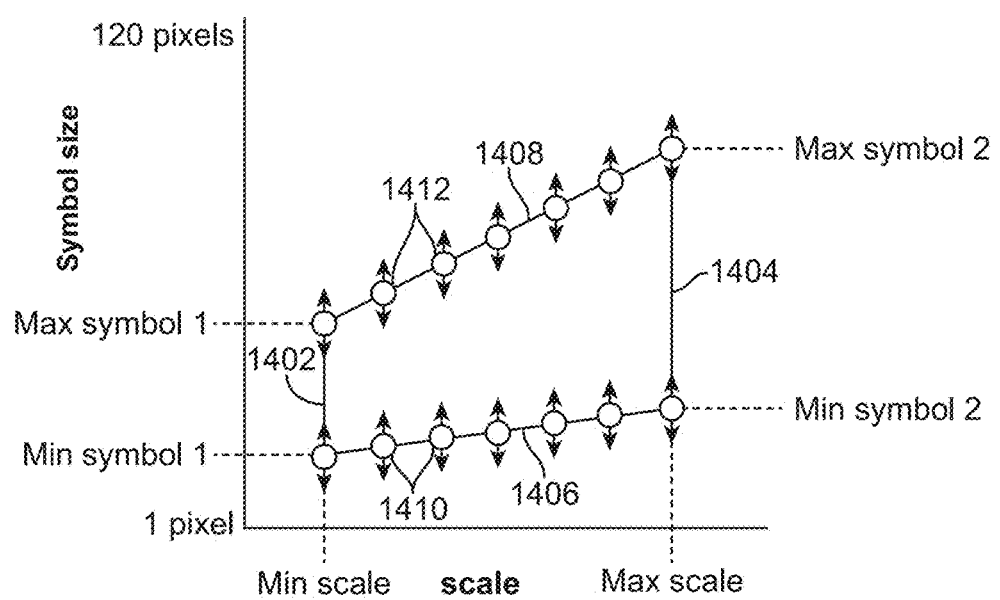
FIG. 14 is the diagram of FIG. 3 showing user adjustability of the minimum and maximum values at a variety of points along the scale, according to certain embodiments of the invention.

FIG. 14 is the diagram of FIG. 12 showing user adjustability of the minimum and maximum values at a variety of points along the scale, according to certain embodiments of the invention. Line 1402 is the minimum map scale or zoom level, and line 1404 indicates the maximum map scale or zoom level. Line 1406 indicates the minimum feature size, and line 1408 indicates the maximum feature size. As can be seen, the minimum and maximum feature sizes vary at different zoom levels. The user can manually vary the height at various points along the sloped limit lines, as indicated by arrows 1410 and 1412.

Smart Default Line Width and Transparency for Different Zoom Levels

Figure 15:
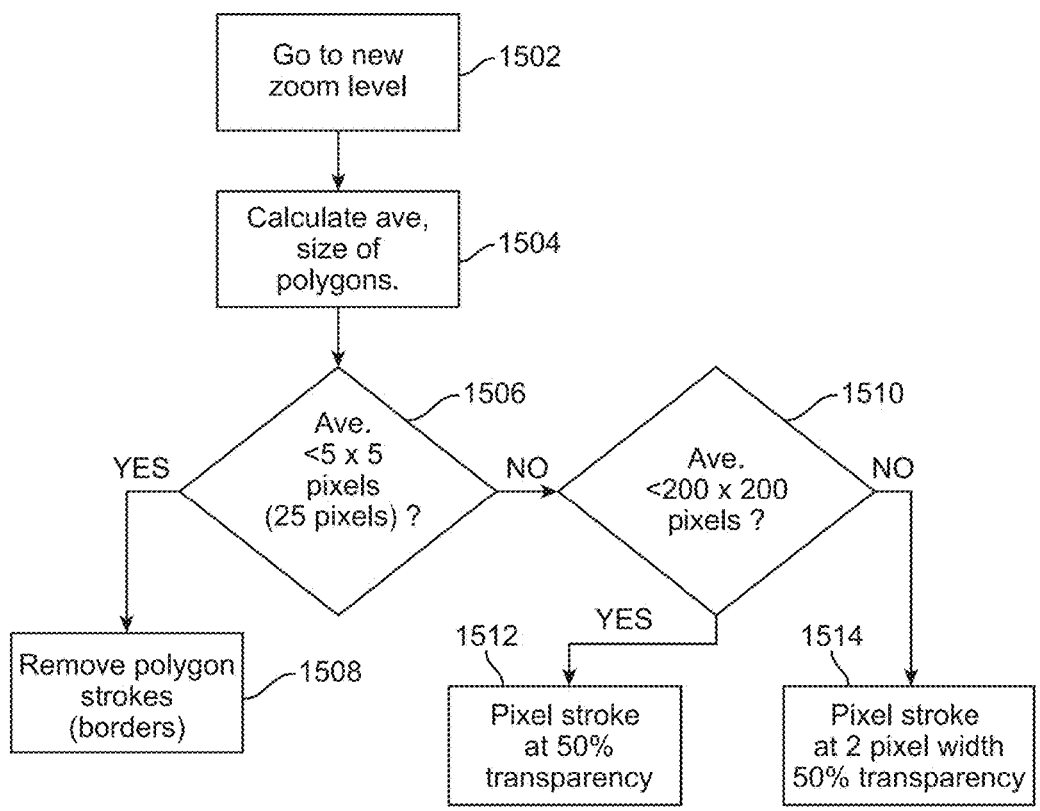
FIG. 15 is simplified flow diagram illustrating aspects of a method for varying line width and transparency proportional to the average size of polygons on a map, according to certain embodiments of the invention.

FIG. 15 is simplified flow diagram illustrating aspects of a method for varying line width and transparency proportional to the average size of polygons on a map, according to certain embodiments of the invention. The process repeats at each zoom level, step 1502. The average size of the polygons at the zoom level is calculated (1504). If the average size is less than 5×5 pixels, or 25 pixels (1506), the polygon stroke (line or border) is eliminated (1508). If the average size is greater than 25 pixels, but less than 200×200 pixels (40,000 pixels) (1510), the pixel stroke is maintained at one pixel width, but is made 50% transparent (1512). If the average size of the polygons is greater than 200×200 pixels, the pixel stroke is widened to 2 pixels wide, but is kept at 50% transparent (1514). Alternate size limits could be uses, such as 50 pixels instead of 25 for the lower limit, or 150 or 250 instead of 200 for the upper limit.

FIGS. 16A-16E are diagrams illustrating map view at different zoom levels using the method of FIG. 15, according to certain embodiments of the invention. FIG. 16A shows where the polygons are less than 5×5, with no stroke used. The small size of the polygons would be overwhelmed if strokes were used. Instead of seeing the underlying color coding of the interior of the polygons (e.g., red, orange, blue, etc.), one would only see the nearly solid block of the polygon strokes (borders). With the strokes removed, the colors can still be seen, with the information conveyed by the colors. For example, the colors might represent population or sales by region.

FIGS. 16B-16D illustrate map zoom levels where the average polygon size is between 5×5 and 200×200. Thus, a single pixel wide, 50% transparent stroke is used. FIG. 16B shows how this looks with 10×10 pixel average size, FIG. 16D shows 40×40 average polygon size, and FIG. 16C is in-between. FIG. 16E shows where the average polygon size is greater than 200×200, and thus the stroke is widened to be 2 pixels wide with 50% transparency. This variation is smooth, not jolting to the user, and improves the readability of the map at each zoom level.

The levels at which changes are made, and the changes in the strokes themselves, can be varied. In addition, a measure other than the average size could be used, such as the mean polygon size, average or mean polygon border circumference. Also, for example, the measure could be 5, 10, 20 or 25% higher or lower than the average or mean. Also, the wider stoke could be only 25% transparent, or not transparent at all. Alternately, the transparency could be varied instead of the width.

Figure 17:
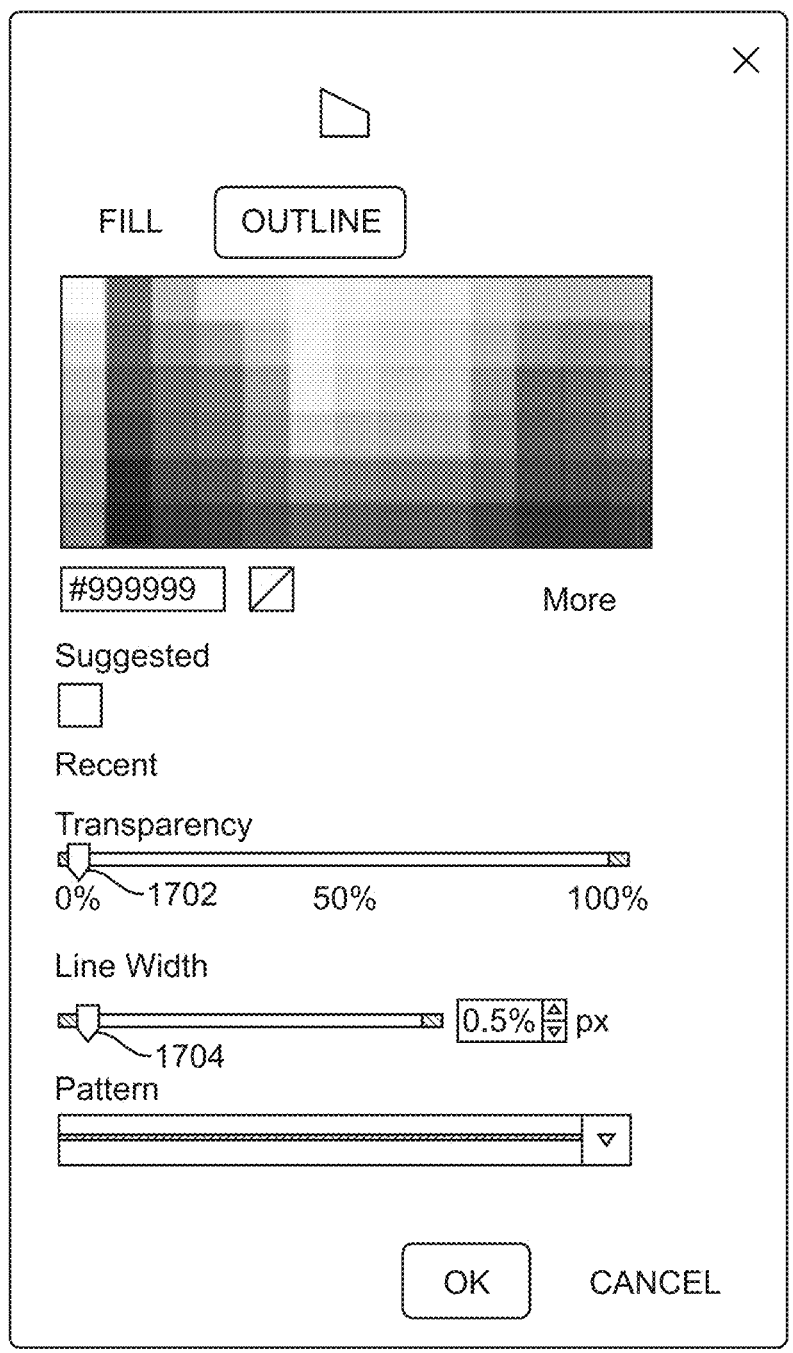
FIG. 17 is diagram of a user interface for adjusting the default parameters set according to the foregoing embodiments, according to certain embodiments of the invention.

FIG. 17 is diagram of a user interface for adjusting the default parameters set according to the foregoing embodiments, according to certain embodiments of the invention. A slider 1702 can be used to vary the transparency, and a slider 1704 can be used to vary the line width. Alternately, up/down arrows 1706 can be used to vary the line width, and a similar mechanism could be used for line transparency.

In one embodiment, the calculation of the average polygon size is done by calculating the average of a random sampling of polygons on a map, such as 500 polygons, or 10% of the polygons, or any other number with a meaningful sample. In one embodiment, line widths or average polygon sizes for average polygon sizes between calculated values is interpolated. In one embodiment, the feature, line and minimum and maximum feature sizes can be varied at a particular zoom level based on the area of the map that is being zoomed. The areas with larger features or polygons can be tagged so that they have larger overlay features. For example, a zoom level in Texas may have bigger features than the same zoom feature in Rhode Island.

Data-Driven Workflow for Picking an Appropriate Thematic Map

FIG. 4 depicts a workflow to quickly and automatically analyze and match received data to determine an appropriate way to map the data, according to certain embodiments of the invention. This data driven workflow eliminates unwise or non-optimal mapping choices from the user and presents optional map representations on the fly. In a typical mapping application, the same list of choices are available to the user regardless of whether they are a good fit for the data in particular session. For example, the data may represent different categories, such product types sold at various store locations (automotive supplies, clothing, furniture, etc.). Showing the different categories by different bubble sizes would be confusing, since readers typically associate that with different amounts, not categories. Thus, the user would be prompted to use different colors for categories, for example.

Referring to FIG. 4, a simplified map generation process includes receiving, by a processor, a dataset including a plurality of data values associated with a geographic map and requesting, by the processor, a first user input indicating whether the data values correspond to a point, line, or area. The process further includes requesting, by the processor, a second user input indicating whether the data values correspond to a location, bin location, nominal data, ordinal data, or numerical data. Based on the first user input response and second user input response, one or more optional map presentations of the dataset are presented to the user. Weak or illegal choices are eliminated from selection, leaving only the best representations. In some embodiments, the user will not be shown these illegal or eliminated choices, making for a much simpler experience. Each presentation will more often than not be very close to a user's preferred representation. For example, if the user indicates that the dataset includes points and they are interested in just locations, the map may use a pushpin style of map showing very dense points generalized into circles. Many other map representations are possible, as shown in FIG. 4.

In one embodiment, a front-end process is provided for the user to upload the dataset. In that process, the user is prompted to tag geographical data values as points, lines or areas. If there is geo-coded data associated with the geographic date, the user is prompted to tag that data as categories or numbers. A second process, which provides the mapping options to the user, then reads those tags to make appropriate recommendations, or list the most appropriate choices first.

Figure 18:
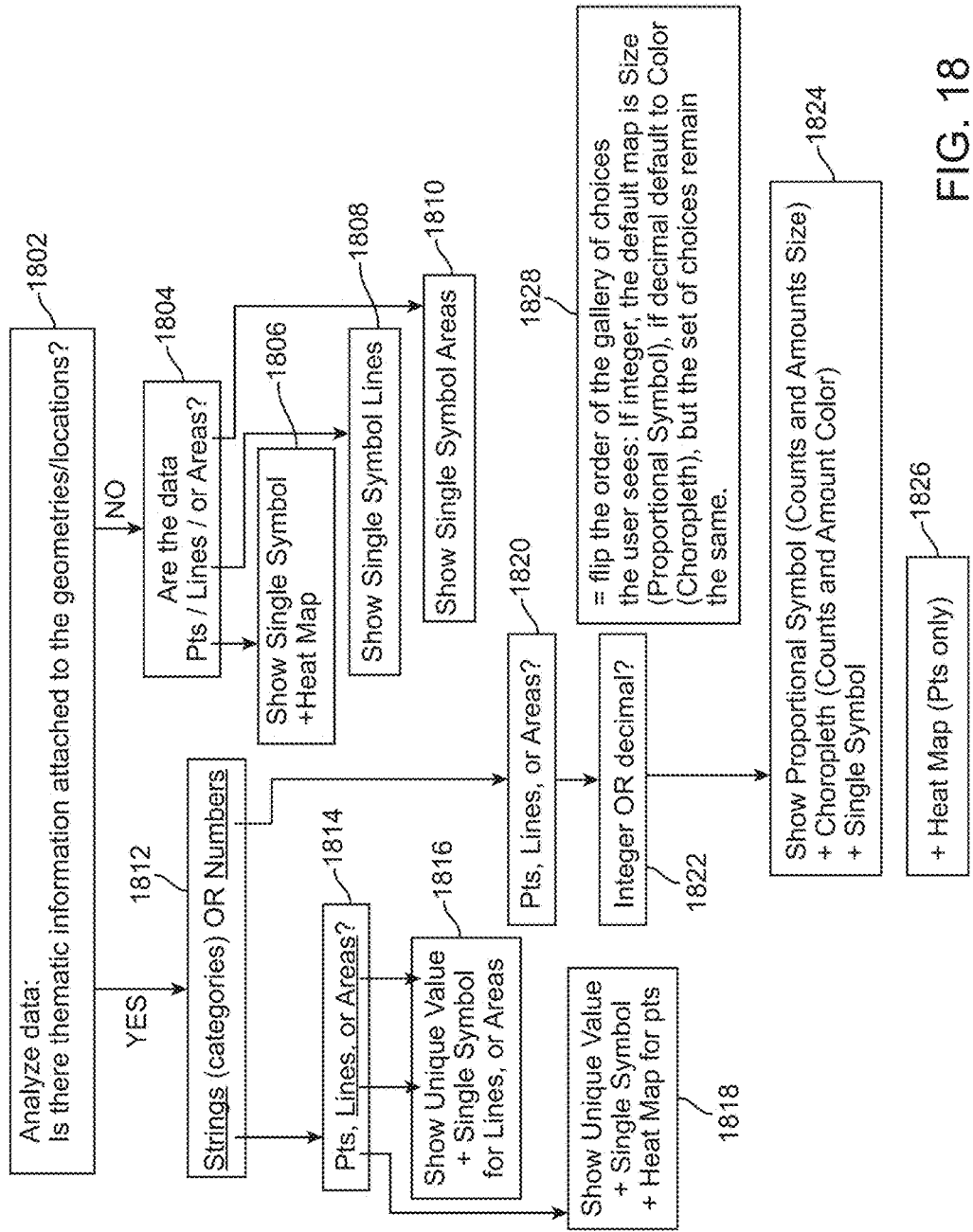
FIG. 18 is a simplified flow diagram illustrating the selection of the most appropriate options based on the type of geographic data and the type of geo-coded data, according to certain embodiments of the invention.

FIG. 18 is a simplified flow diagram illustrating the selection of the most appropriate options based on the type of geographic data and the type of geo-coded data, according to certain embodiments of the invention. At step 1802, the tags are examined to determine if there is only geometric/location data, or whether there is a tag for geo-tagged thematic information. If there is only geometric/location data, another tag is examined to determine if the data is points, lines or areas (1804). If the data is points, the software will display to the user, as a recommended option, using a single symbol and a heat map (1806). Referring back to FIG. 4, the first row shows those recommended symbols for "just locations." If the data is points, pushpins are recommended, with circles used for very dense areas of points. If the data is lines (e.g., roads, rivers) a line is recommended (1808). If the data is an area, a polygon outline is recommended (1810). Some of these are fairly obvious choices, but by automatically selecting the best option, the user interface and user experience is vastly simplified.

If there is also geo-tagged thematic data, the tags are examined to determine if the data is categories (strings) or numbers (1812). If the data is categories, the geo-data tag is examined to determine if it is points, lines or areas (1814). If it is lines or areas, the category is displayed as a unique value and a single symbol is used for lines (line) or areas (polygon) (1816). If it is points, again a unique value is used for the category, and a single symbol (push pin) and heat map is recommended (1818).

If the thematic data is numbers, the geo-data tag is examined to determine if it is points, lines or areas (1820). Another tag is examined, or the numbers themselves are sampled, to determine if they are integers or decimals (1822). A decimal is determined by looking for a dot in the number fields. If the geo-data is lines or areas, single symbols are used for the geo-data (lines, polygons) and the thematic number data has two options presented to the user: (1) using a proportional symbol with a varying size, and (2) a cloropleth—a single size symbol with varying color (1824). If the geo-data is points, a heat map option is provided to the user (1826).

In one embodiment, depending on whether the data is integers or decimals, the order of the gallery of choices is flipped (1828). If the numbers are integers, the default option for the map is size (a proportional symbol). If the numbers include decimals, the default option is color (cloropleth). Both options are still shown to the users, just the order of the presentation is flipped.

The options of FIG. 18 are just one example. There are many more examples in FIG. 4, and variations beyond FIGS. 4 and 18 are contemplated. In FIG. 4, the options for just locations (402), for points, are pushpins generalized into circles, lines for lines, and polygons for area, as discussed above. For bin locations (404), which refers to data that can be summed, the options provided can be color ramps, hexagons and heat maps. Nominal data (406) refers to unrankable categories. The recommended display is hues for each of the geography types (points, lines, areas). The hues can be, for example, yellow, orange, green, blue, etc.

Ordinal data (408) includes rankable categories. Here, the options are varying hues (color ramps—light to dark) or varying sizes. In one embodiment, the software can automatically determine if the category data strings are ordenable by searching for certain words (e.g., low, medium, high). For example, the ordenable data could be low, medium and high fire risk areas, which could ideally be represented as yellow, orange and red.

Numerical data (410) provides a larger number of options than the other categories. For example, for lines, the data options can be a continuous color ramp, proportional line thickness or proportional transparency.

In one embodiment, instead of presenting the user with choices, the map can simply be rendered and displayed with the optimum choice. The user can then be presented an interface to change the choices, or see the alternative choices. Alternately, multiple maps, or portions of multiple maps can be displayed, each showing a different one of the choices. Thus user could simply click on the desired map portion to display the whole map with that option.

In one embodiment, multiple attributes can be mapped, such as both income and average age. Different symbols would then be assigned to each, with the size of the symbols varying with the number. The symbols recommended may be of similar type or opposite type. For example, the user can be given both the similar and opposite options to choose from. For example, similar types might be circles for income and squares for average age. Opposite types might be circles for income, but colors for average age.

In one embodiment, redundant symbolization is provided. For example, both size and transparency can be used for the same thing. As the symbols get larger, they also get more opaque.

Variations of Embodiments

While the invention has been described with respect to specific embodiments, one of ordinary skill in the art will recognize that numerous modifications are possible. Thus, although the invention has been described with respect to specific embodiments, it will be appreciated that the invention is intended to cover all modifications and equivalents within the scope of the following claims.

The above disclosure provides examples and aspects relating to various embodiments within the scope of claims, appended hereto or later added in accordance with applicable law. However, these examples are not limiting as to how any disclosed aspect may be implemented.

All the features disclosed in this specification (including any accompanying claims, abstract, and drawings) can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. § 112, sixth paragraph. In particular, the use of "step of" in the claims herein is not intended to invoke the provisions of 35 U.S.C. § 112, sixth paragraph.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, such as Java®, C, C# or C++, or any scripting language, such as Perl, Python or TCL, JSON, as well as combinations thereof. The server(s) may also include database servers, including without limitation those commercially available from Oracle®, Microsoft®, Sybase®° and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method for proportionally sizing symbols on a map, the method comprising:

receiving, by a processor, geographic-based data having one or more polygonal features;

calculating, by the processor, a first average polygonal feature size for at least a subset of the one or more polygonal features at a first zoom level;

calculating, by the processor, a second average polygonal feature size for at least a subset of the one or more polygonal features at a second zoom level;

for a first display of the map at the first zoom level, setting a first minimum symbol size to a first predetermined percentage of the first average polygonal feature size, wherein the first minimum symbol size is less than 100% of the first average polygonal feature size;

for the first display of the map at the first zoom level, setting a first maximum symbol size to a second predetermined percentage of the first average polygonal feature size, wherein the first maximum symbol size is greater than 100% of the first average polygonal feature size;

for a second display of the map at the second zoom level having the same polygonal features as the first zoom level, setting a second minimum symbol size to the first predetermined percentage of the second average polygonal feature size, wherein the second minimum symbol size is less than 100% of the second average polygonal feature size;

for the second display of the map at the second zoom level, setting a second maximum symbol size to the second predetermined percentage of the second average polygonal feature size, wherein the second maximum symbol size is greater than 100% of the second average polygonal feature size;

rendering a first overlay of the symbols on the map at the first zoom level;

displaying the first overlay on the map on a display;

rendering a second overlay of the symbols on the map at the second zoom level;

displaying the second overlay on the map on the display;

wherein the symbols include at least one of lettering for labels, numbers, arrows, direction indicators, icons, circles, or bar graphs, wherein the polygon features include at least one of states, counties, cities, zip codes, areas of common vegetation, bodies of water, roads, or buildings; and wherein the symbols represent at least one of income, life expectancy, population, or sales.

2. The method of claim 1 wherein the minimum symbol size ranges from 2 pixels to 16 pixels.

3. The method of claim 1 wherein the maximum symbol size ranges from 50 pixels to 80 pixels.

4. The method of claim 1 wherein the maximum symbol size ranges from 25 pixels to 80 pixels.

5. The method of claim 1 wherein the average feature size is calculated using features associated with the geographic-based data including features outside of a current map extent.

6. The method of claim 1 further comprising interpolating between the minimum and maximum symbol sizes for zoom levels between the first and second zoom levels.

7. The method of claim 1 further comprising providing a user interface to allow a user to adjust the minimum and maximum symbol sizes.

8. A method for proportionally sizing symbols on a map, the method comprising:
   receiving, by a processor, geographic-based data having one or more polygonal features;
   calculating, by the processor, a first average polygonal feature size for at least a subset of the one or more polygonal features at a first zoom level;
   calculating, by the processor, a second average polygonal feature size for at least a subset of the one or more polygonal features at a second zoom level;
   for a first display of the map at the first zoom level, setting a first minimum symbol size to a first predetermined percentage of the first average polygonal feature size, wherein the first minimum symbol size is less than 100% of the first average polygonal feature size, wherein the minimum symbol size ranges from 4 pixels to 16 pixels, and storing the minimal symbol size in a memory, indexed to the corresponding zoom level;
   for the first display of the map at the first zoom level, setting a first maximum symbol size to a second predetermined percentage of the first average polygonal feature size, wherein the first maximum symbol size is greater than 100% of the first average polygonal feature size, wherein the maximum symbol size ranges from 25 pixels to 80 pixels, and storing the minimal symbol size in a memory, indexed to the corresponding zoom level;
   for a second display of the map at the second zoom level having the same polygonal features as the first zoom level, setting a second minimum symbol size to the first predetermined percentage of the second average polygonal feature size, wherein the second minimum symbol size is less than 100% of the second average polygonal feature size, wherein the minimum symbol size ranges from 4 pixels to 16 pixels, and storing the minimal symbol size in a memory, indexed to the corresponding zoom level;
   for the second display of the map at the second zoom level, setting a second maximum symbol size to the second predetermined percentage of the second average polygonal feature size, wherein the second maximum symbol size is greater than 100% of the second average polygonal feature size, wherein the maximum symbol size ranges from 25 pixels to 80 pixels, and storing the minimal symbol size in a memory, indexed to the corresponding zoom level;
   interpolating, by the processor, between the minimum and maximum symbol sizes for zoom levels between the first and second zoom levels;
   rendering a first overlay of the symbols on the map at the first zoom level;
   displaying the first overlay on the map on a display;
   rendering a second overlay of the symbols on the map at the second zoom level;
   displaying the second overlay on the map on the display;
   wherein the symbols include at least one of lettering for labels, numbers, arrows, direction indicators, icons, circles, or bar graphs,
   wherein the polygon features include at least one of states, counties, cities, zip codes, areas of common vegetation, bodies of water, roads, or buildings; and
   wherein the symbols represent at least one of income, life expectancy, population, or sales.

9. The method of claim 1 wherein the polygon size is based upon an area of the polygons.

* * * * *